(12) United States Patent
Wegryn et al.

(10) Patent No.: US 10,474,703 B2
(45) Date of Patent: Nov. 12, 2019

(54) METHOD AND APPARATUS FOR NATURAL LANGUAGE QUERY IN A WORKSPACE ANALYTICS SYSTEM

(71) Applicant: Lakeside Software, Inc., Bloomfield Hills, MI (US)

(72) Inventors: Edward S. Wegryn, Ann Arbor, MI (US); Lawrence J. Birk, Ann Arbor, MI (US); Christopher Dyer, Ann Arbor, MI (US); Kenneth M. Schumacher, Orchard Lake, MI (US)

(73) Assignee: Lakeside Software, Inc., Bloomfield Hills, MI (US)

( * ) Notice: Subject to any disclaimer, the term of this patent is extended or adjusted under 35 U.S.C. 154(b) by 308 days.

(21) Appl. No.: 15/629,203

(22) Filed: Jun. 21, 2017

(65) Prior Publication Data

US 2018/0060420 A1     Mar. 1, 2018

Related U.S. Application Data

(60) Provisional application No. 62/379,708, filed on Aug. 25, 2016.

(51) Int. Cl.
*G06F 17/20*     (2006.01)
*G06F 16/33*     (2019.01)
(Continued)

(52) U.S. Cl.
CPC ........ *G06F 16/3338* (2019.01); *G06F 16/243* (2019.01); *G06F 16/3323* (2019.01);
(Continued)

(58) Field of Classification Search
CPC .......... G06F 17/20; G06F 17/21; G06F 17/27; G06F 17/2735; G06F 17/278;
(Continued)

(56) References Cited

U.S. PATENT DOCUMENTS

| | | |
|---|---|---|
| 7,840,589 B1 | 11/2010 | Holt et al. |
| 7,865,499 B2 | 1/2011 | Schumacher |

(Continued)

OTHER PUBLICATIONS

"Soundex", https://en.wikipedia.org/wiki/Soundex (downloaded from Wikipedia on May 3, 2017, 3 pgs.).

(Continued)

*Primary Examiner* — Qi Han
(74) *Attorney, Agent, or Firm* — Dykema Gossett PLLC

(57) ABSTRACT

A method includes associating, for each one of a plurality of answer definitions, at least one or more pattern-form questions, wherein each answer definition has an associated jump target that defines a respective entry point into the workspace analytics system to provide information responsive to the associated one or more pattern-form questions. The method further includes receiving a user input including capturing input text defining a natural language user query, matching the received input text to one of the pattern-form questions thereby selecting the jump target associated with the matched pattern-form question, and generating a response to the natural language user query by retrieving information from the workspace analytics system by referencing a link based on the selected jump target and zero or more parameters values.

13 Claims, 8 Drawing Sheets

(51) Int. Cl.
*G06F 16/242* (2019.01)
*G06F 16/951* (2019.01)
*G06F 16/332* (2019.01)
*G06F 16/903* (2019.01)
*G06F 17/27* (2006.01)

(52) U.S. Cl.
CPC ...... *G06F 16/3329* (2019.01); *G06F 16/3344* (2019.01); *G06F 16/90344* (2019.01); *G06F 16/951* (2019.01); *G06F 17/278* (2013.01); *G06F 17/2795* (2013.01)

(58) Field of Classification Search
CPC ............. G06F 17/2785; G06F 17/2795; G06F 17/2881; G06F 17/30
USPC .............................................. 704/9, 1, 7, 10
See application file for complete search history.

(56) References Cited

U.S. PATENT DOCUMENTS

| | | | |
|---|---|---|---|
| 8,447,604 | B1 | 5/2013 | Chang |
| 8,600,747 | B2 | 12/2013 | Abella et al. |
| 9,659,067 | B2 | 5/2017 | de Sousa |
| 9,953,640 | B2 | 4/2018 | Rice et al. |
| 2002/0069223 | A1* | 6/2002 | Goodisman ......... G06F 16/9535 715/201 |
| 2002/0116350 | A1 | 8/2002 | Hodjat et al. |
| 2003/0200190 | A1 | 10/2003 | Adar et al. |
| 2011/0301941 | A1 | 12/2011 | De Vocht |
| 2012/0136649 | A1 | 5/2012 | Freising et al. |
| 2013/0151238 | A1 | 6/2013 | Beaurpere et al. |
| 2013/0254139 | A1* | 9/2013 | Lei .................. G06N 20/00 706/11 |
| 2013/0325844 | A1 | 12/2013 | Plaisant |
| 2014/0006012 | A1 | 1/2014 | Zhou et al. |
| 2014/0012585 | A1 | 1/2014 | Heo et al. |
| 2014/0087697 | A1* | 3/2014 | Johnston ............ H04W 4/12 455/412.1 |
| 2014/0136197 | A1 | 5/2014 | Mamou et al. |
| 2014/0278362 | A1 | 9/2014 | Gerken, III et al. |
| 2015/0205858 | A1* | 7/2015 | Xie ................. G06Q 50/01 707/755 |
| 2016/0180438 | A1* | 6/2016 | Boston ............. G06Q 30/0631 705/26.7 |
| 2017/0300495 | A1 | 10/2017 | Sharifi et al. |
| 2017/0329778 | A1 | 11/2017 | Allen et al. |

OTHER PUBLICATIONS

"Metaphone", https://en.wikipedia.org/wiki/Metaphone (downloaded from Wikipedia on May 4, 2017, 4 pgs.).

"Sørensen-Dice coefficient", https://en.wikipedia.org/wiki/S%C3%B8rensen%E2%80%93Dice_coefficient (downloaded from Wikipedia on May 4, 2017, 4 pgs.).

* cited by examiner

METHOD AND APPARATUS FOR NATURAL LANGUAGE QUERY IN A WORKSPACE ANALYTICS SYSTEM

CROSS-REFERENCE TO RELATED APPLICATIONS

This application claims the benefit of United States provisional application No. 62/379,708, filed 25 Aug. 2016 (the '708 application), which '708 application is hereby incorporated by reference as though fully set forth herein.

BACKGROUND a. Technical Field

The instant disclosure relates generally to a natural language interface and more particularly, in an embodiment, to a natural language interface for a workspace analytics system.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

It is known to provide an workspace analytics system, for example, adapted to manage information relating to computers in a distributed computer network, such as seen by reference to U.S. Pat. No. 7,865,499 entitled "SYSTEM AND METHOD FOR MANAGING INFORMATION FOR A PLURALITY OF COMPUTER SYSTEMS IN A DISTRIBUTED NETWORK", assigned to Lakeside Software, Inc., the common assignee of the instant application. Generally, a workspace analytics system may provide a tool that allows analysis of user behavior, hardware and software utilization, health and performance and component dependencies in complex computing environments. Accurate and timely information provided by such systems allows its users, such as information technology (IT) professionals, to effectively direct spending such that the best return on investment may be achieved while simultaneously improving the end user experience.

In order to provide quality analytics, a workspace analytics system is typically configured to collect, manage and maintain a relatively large amount of data. In addition to acquisition and storage of the data, the system manages historical retention and organization to support a wide variety of tools and interfaces to allow access to the information. The system may provide a large number of tools, reports and dashboards that each serve important purposes.

One challenge that arises as a result of the breadth of data and tools available in such a system is that significant training on the information and tools available is often necessary in order to allow users to answer questions posed in the IT realm. Users that are skilled in the data and use of the tools are highly successful in applying the analytics to real world problems, but must overcome a learning curve in order to gain access to the technically powerful toolset. However, users without the experience and/or skill in using the system can sometimes not make the best and/or fullest use of available information and tools.

The foregoing discussion is intended only to illustrate the present field and should not be taken as a disavowal of claim scope.

SUMMARY

Analytical systems require the user to adapt to the technology. However, people interact with each other in natural languages, such as English, but must interact with the technology in technical terms. One goal of embodiments consistent with the instant disclosure is to reduce or eliminate that hurdle by allowing a user to directly interact with such complex software systems through a natural language interface.

In an embodiment, a computer-implemented method is presented for providing a natural language interface to process user queries for information managed in a subject system, which in an embodiment, may be a workspace analytics system. The method includes associating, for each one of a plurality of answer definitions, at least one or more pattern-form questions, wherein each answer definition has an associated jump target that defines a respective entry point into the subject system to provide information responsive to the associated one or more pattern-form questions. The method further includes receiving a user input including capturing input text, wherein the input text defines a natural language user query. The method still further includes matching the received input text to one of the pattern-form questions thereby selecting the jump target associated with the matched pattern-form question. The method also includes generating a response to the natural language user query by retrieving information from the subject system by referencing a link based on the selected jump target and zero or more parameters values.

Other methods and apparatus are presented.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Before proceeding to a detailed description of a method and apparatus for providing a natural language interface, an overview description of such an apparatus and method will first be described. In an embodiment, the natural language interface according to the instant disclosure is designed to allow end users to ask questions using text or speech in their natural language (e.g., English), the answers to which are provided by a workspace analytics system to which the interface is in communication. The interface also assists the end users in identifying the best answer to their question. The best answer may be based on domain knowledge loaded into a computer system ahead of time and the answer can be presented in multiple ways. The natural language interface is not intended to be a generic search engine, but rather is configured to direct users to "best of" the particular information that exists in the workspace analytics system to which the natural language interface is coupled.

Figure 1:
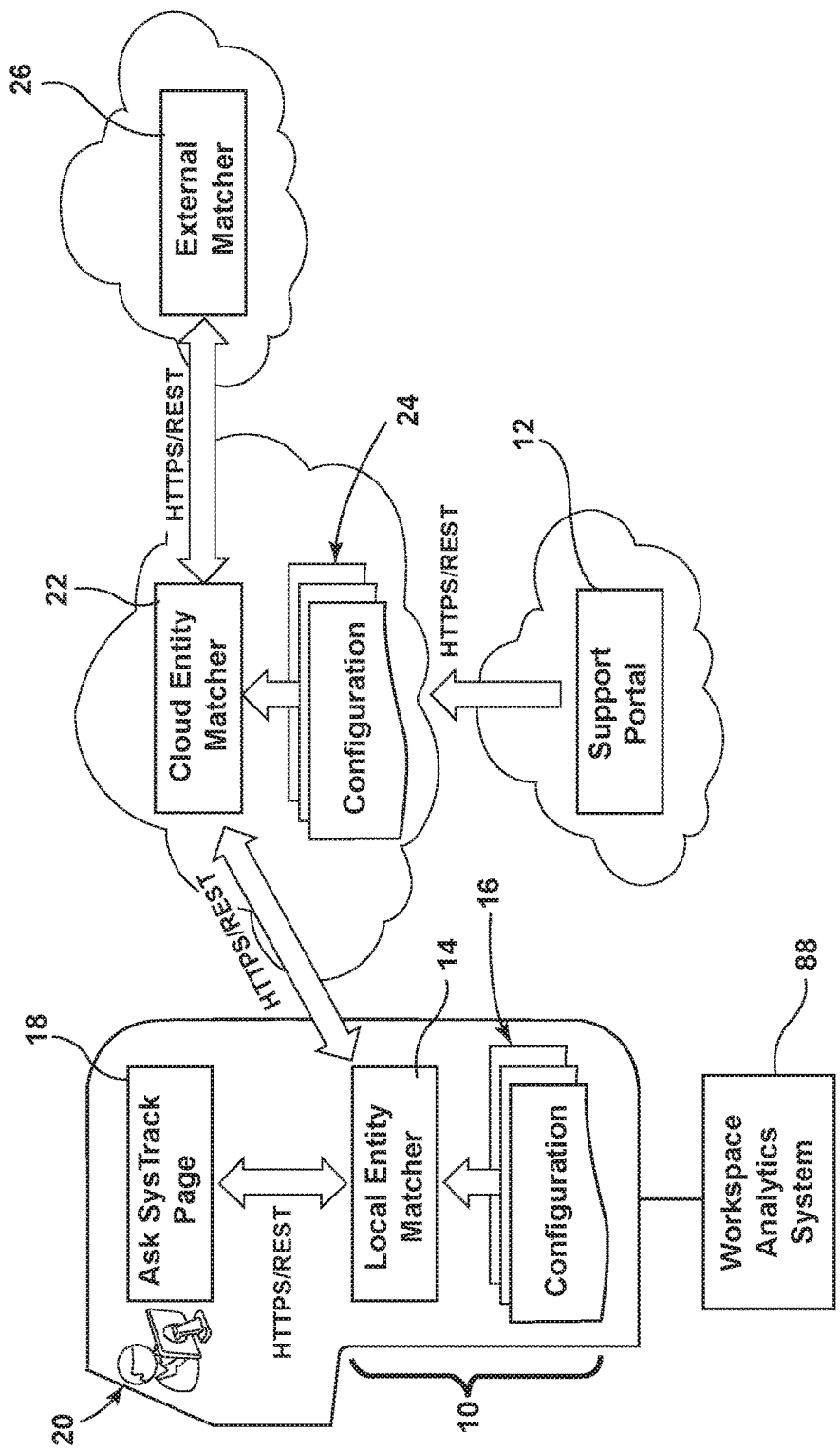
FIG. 1 is a simplified diagrammatic view of an apparatus for providing a natural language interface, in an embodiment.

Referring now to the drawings wherein like reference numerals are used to identify identical or similar components in the various views, FIG. 1 is a simplified, diagrammatic view of an apparatus 10 for providing a natural language interface for an external software system, such as a workspace analytics system 88 (best shown in FIG. 7), in an exemplary environment.

The apparatus 10 may include a support portal 12, a mechanism through which new or updated configuration files can be pushed to the cloud (see configuration files 24). The apparatus 10 may further includes at least a local entity matcher 14 and various configuration files 16.

As illustrated in FIG. 1, the apparatus 10 may be configured, through a user interface, to present a web page 18 displayed to a user 20 who interacts with the user interface to retrieving information from workspace analytics system 88 (including a data warehouse—not shown in FIG. 1). In an embodiment, the apparatus 10 is configured to direct users to and into the proper area of the data warehouse of system 88, the apparatus 10 is configured more generally configured to direct users to any URL addressable resource. For example only, a large government or educational institution site with many different areas of information could define questions and answers that, when matched—launch the corresponding page on their site. For further example, in an embodiment configured for a university, where a user asks "Are any scholarships available?" the apparatus 10 would be operative to jump to the scholarship page of the university. As a still further example, the apparatus 10 can be configured with training about a third-party technical product, and the apparatus 10 is configured such that it may direct the user either to the main product (e.g., workspace analytics system and associated data) if it provides the most appropriate response or to such third party technical product if it has the most appropriate data response.

The apparatus 10 may include an on premise web service that hosts the local entity matcher (EM) 14. FIG. 1 further shows a cloud based service hosting a secondary cloud EM 22 with associated configuration file(s) 24, and an optional third cloud-based external matcher 26. The external matcher 26 may be a separate component from apparatus 10 (e.g., a separate service that is not part of either apparatus 10 or support portal 12 and thus has no explicit a priori knowledge of either. In an embodiment, the external matcher 26 may be used to supplement the matching capabilities of apparatus 10 for difficult matching scenarios to improve the overall results, for example, through extended grammatical analysis capabilities. The external matcher 26 may be omitted without significantly altering the behavior or accuracy of apparatus 10. In another embodiment, it is possible to use a series of such services for backend augmentation of the secondary EM 22.

Figure 2:
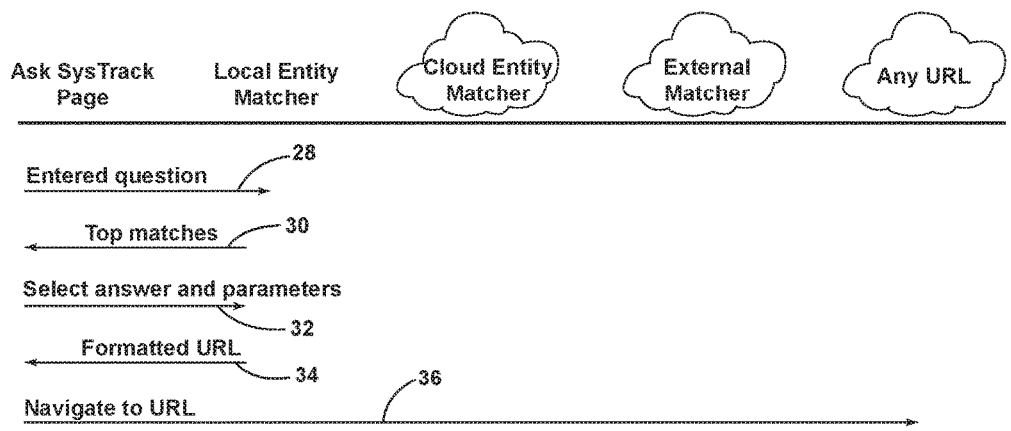
FIG. 2 is a simplified, high-level diagram showing requests/responses by and between various components including a local entity matcher (EM) of the apparatus of FIG. 1.

FIG. 2 is a simplified, high-level diagram showing requests/responses by and between various components of the apparatus 10 for providing a natural language interface. When the user 20 asks a question (shown at arrow 28) in a natural language (NL) format (i.e., informal English language question), the apparatus 10 initially refers to the local entity matcher (EM) 14 to identify best matches. The local EM 14 is configured to determine the best matches. If a suitable match is found, the apparatus 10 presents the results to the user 20. In an embodiment, apparatus 10 may be configured to provide two modes of presenting the results to the user, as described in greater detail below. But in both modes, a single question is selected and the user 20 is further prompted for parameters values, if needed.

For example, consider the question "How much memory does [package] use?" As known by the apparatus 10, the question has one parameter, namely, [package]. If the user 20 entered the text "How much memory does Microsoft Office use?", that would fit the pattern (i.e., sometimes referred to herein as a pattern question) and the variation with respect to the [package] parameter would be returned by apparatus 10. If the value (i.e., the value or specific package name being referred to: Microsoft Office) in the user-entered question matches a package that the apparatus 10 was configured to know about, the parameter will be pre-populated in the results. So in the case where the user 20 entered "How much memory does Microsoft Office use?", the apparatus 10 would match to the known (pattern) question "How much memory does [package] use?" and further match "Microsoft Office" to the package parameter (value). If no parameter match can be found, the user 20 is prompted for the parameter value from a configured list of values for the particular parameter.

An advantage of the instant natural language interface is that it includes a data acquisition capability that assembles information about the customer environment in which it operates. Inherently using this data, the apparatus 10 is able to assemble highly relevant, but only locally significant, lists of entities (e.g., lists of user names, application names, or system names). An entity is a term that is relevant within the workspace analytics system which is accessed by the instant natural language interface. In addition to the above, an entity may also include with limitation a domain name, a disk name, a network interface, etc.

There are therefore entities, and entity matching may be improved through the use of these generated lists of known entities. It should be further noted that such lists need not be stored in the secondary or external EM matchers 22, 26, as the entity recognition process can be performed locally, in an embodiment. This approach has the advantage of controlling bandwidth consumption in networking to connect to the cloud, avoidance of privacy concerns that would otherwise result from uploading specific entity data off-site from a customer's premise, and the ability to use a common cloud instance for all customers, without the need to segregate the cloud part of the system.

If a local entity match is found by the local EM 14, then the entity value or specific information can be replaced in the query (i.e., user query) with a neutralized, generic marker. This improves matching on the remaining user input text since the particular entity values (e.g., entity names) will not be present in any of the pre-determined training content with which a match is attempted. To the extent that a user query needs to be forwarded to the cloud EM 22, entity replacement avoids having to send any privacy content, like a user name, out of the local customer environment.

When the input text (NL query) has been matched to one of the pattern questions, the match, in effect, defines an "answer". This is because each of the pattern questions or grouping of pattern questions has been configured in advance to point to a respective entry point in the workspace analytics system—this entry point will provide information that is responsive to the user's query, i.e., the answer. So matching the user query to a pattern question in turn automatically defines the answer/jump target.

Referring to FIG. 2, the web page 18 (FIG. 1) makes a call to the local EM 14, shown as arrow 32, with the selected answer and parameters. The arrow 32 amounts to a request that a formatted URL (shown by arrow 34) should be returned, which contains a navigable link to the answer in the workspace analytics system. The link may include parameter values properly inserted as defined by the configuration for the particular answer and jump target. The web page 18, thereafter navigates to the formatted URL, as shown by arrow 36. Note that locally matched entities may be easily substituted back into and/or appended to formatted URL, allowing results that potentially come from the cloud EM to become locally relevant.

Figure 3:
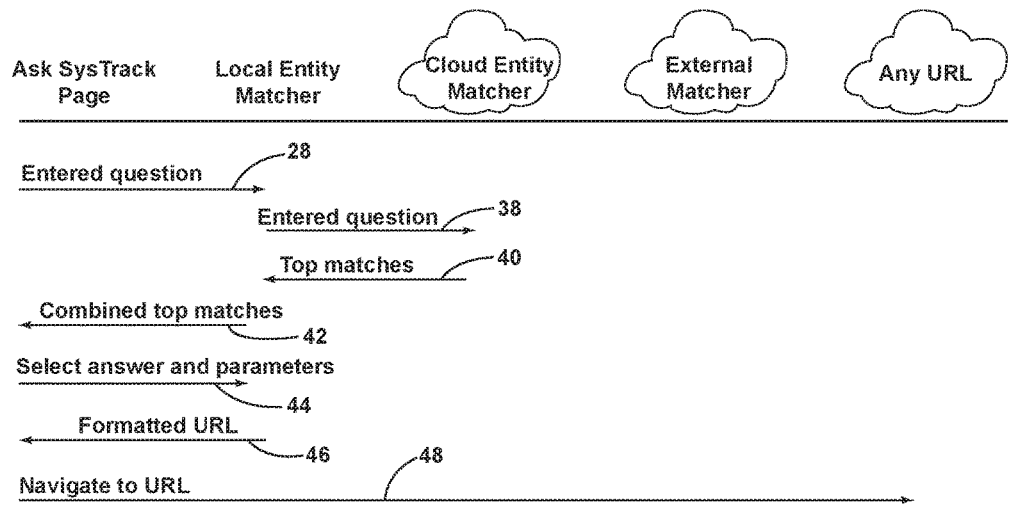
FIG. 3 is a simplified, high-level diagram showing requests/responses by and between various components further including a cloud entity matcher (EM) of the apparatus of FIG. 1.

FIG. 3 is a simplified, high-level diagram showing requests/responses by and between various components, further including a cloud entity matcher (EM) 22. As an extension of FIG. 2, if no match is found by the local EM 14 with sufficient confidence level and/or score (sometimes used herein as simply "confidence"), the apparatus 10 is configured to make a call to the cloud EM 22, in other words, to transmit the user entered query to the cloud EM 22, shown by arrow 38. The cloud EM 22 is configured to search for possible matches, in an embodiment, in an identical fashion to that performed by the local EM 14. It should be understood, however, that other implementations are possible.

The cloud EM 22, including its software and content, may have been updated more recently than the local EM 14, and thus may have matches that were not available to the local EM 14. If the cloud EM 22 has matches with a high enough confidence, such topmost number of matches, shown at arrow 40, are returned to the local EM 14. The local EM 14 then combines top matches 40 with any matches of its own, with the resulting combined set of top matches designated by arrow 42. The remainder of the process then proceeds substantially as described above in connection with FIG. 2 (i.e., the local EM scenario). FIG. 3 thus shows selected answer and parameters arrow 44, formatted URL arrow 46, and navigate to URL arrow 48.

Figure 4:
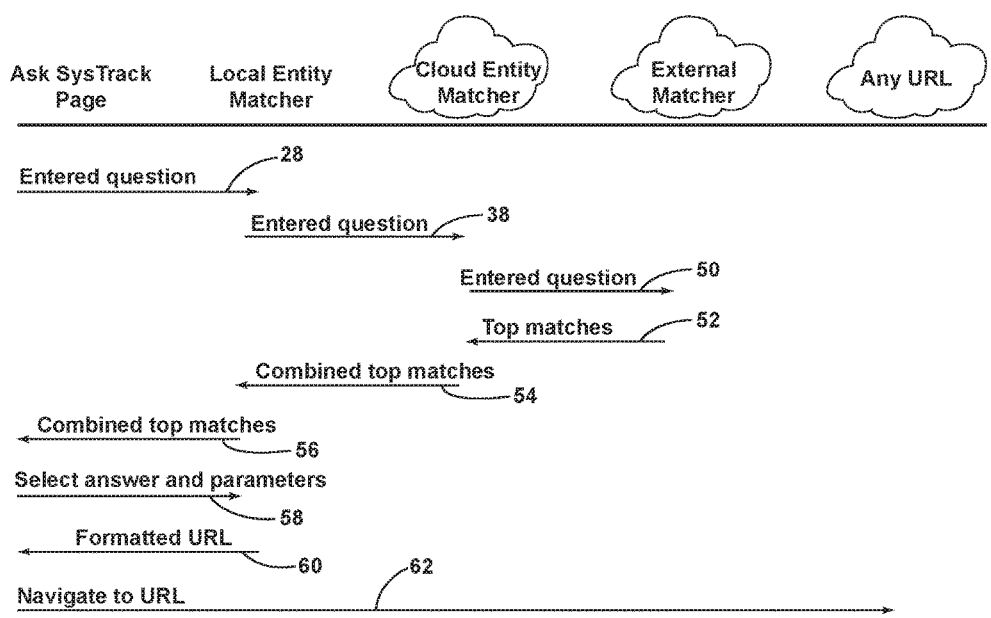
FIG. 4 a simplified, high-level diagram showing requests/responses by and between various components still further including an external entity matcher (EM) of the apparatus of FIG. 1.

FIG. 4 is a simplified, high-level diagram showing requests/responses by and between various components, still further including an external entity matcher (EM) 26. If neither the local EM 14 or the cloud EM 22 find matches with high enough confidence, the cloud EM 22 may be configured, in an embodiment, to make a call to an external text matching service that may provide improved matching (e.g., in regard to grammatical variations). This is shown by arrow 50, with the cloud EM 22 forwarding the user query to the external EM 26. If matches are found with the external EM 26, such matches are returned, as shown by arrow 52. The cloud EM 22 combines the top matches 52 with any of its own to form a combined set, shown by arrow 54. In an embodiment, the combined set of top matches 54 may be sorted by confidence level and/or score.

It is contemplated that in certain circumstances, the external EM 26 also is unable to find any sufficiently close matches as well. In that case, combining the matches returns the best of a set of relatively uncertain matches. In an embodiment, this fact, the confidence score and the causal user query are recorded by the apparatus 10 to allow for improvements to be made so as to reduce and/or avoid such circumstances in the future (e.g., through improved data content or improved training content). The remainder of the flow proceeds in FIG. 4 as with the previously-described cloud EM matching scenario. FIG. 4 thus shows combined top matches arrow 56, selected answer and parameters arrow 58, formatted URL arrow 60, and navigate to URL arrow 62.

Figure 5:
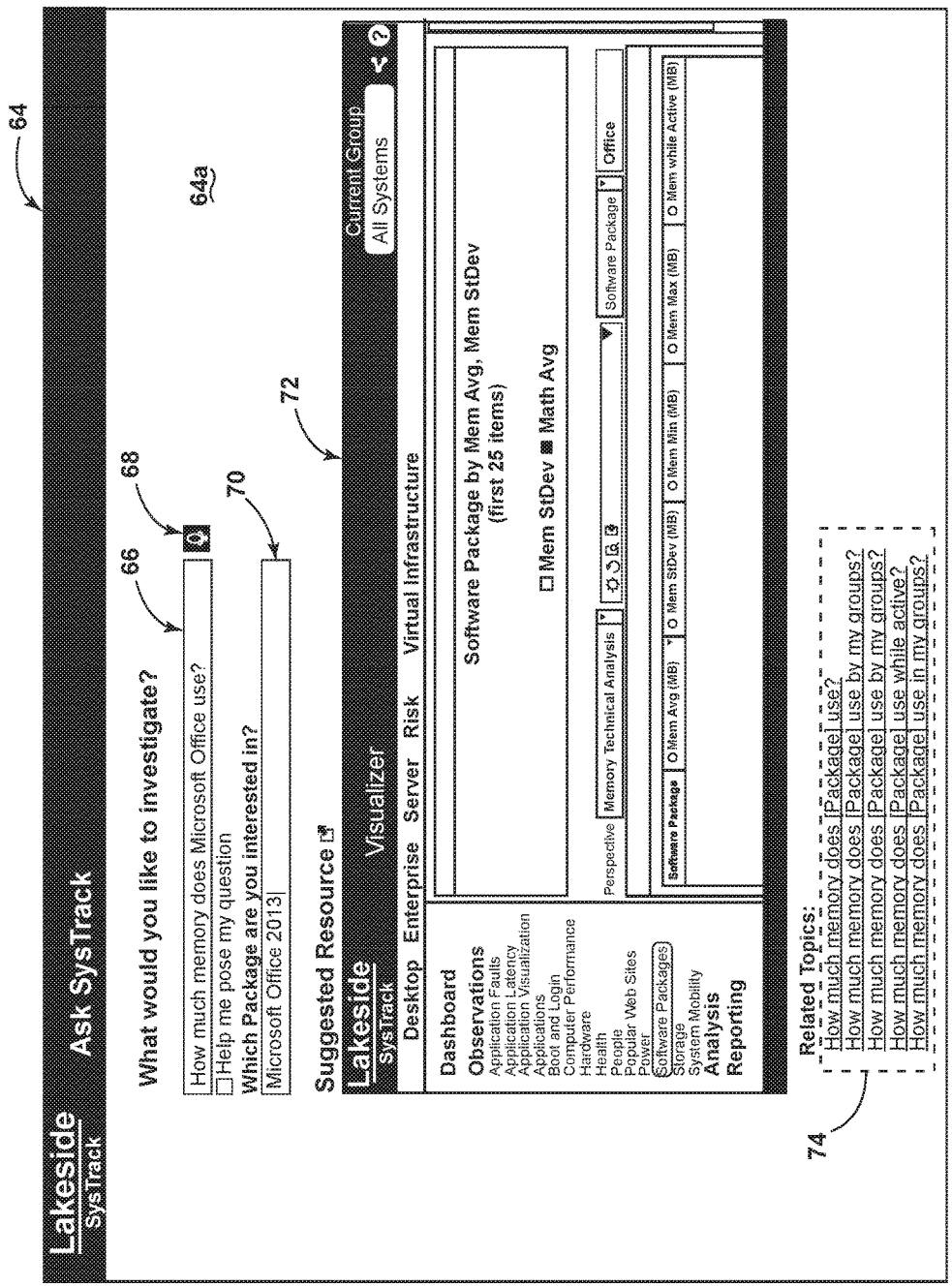
FIG. 5 is a simplified view showing a graphic user interface (GUI) of the natural language interface shown in block diagram form in FIG. 1.

FIG. 5 is a simplified view showing a graphical user interface (GUI) 64 provided by apparatus 10. The GUI 64 is presented on a display 64a visible to the user 20, for example, using conventional display means known in the art. In the illustrated embodiment, the GUI 64 is configured to present a textbox 66 configured to receive user input text defining the user natural language (NL) query, wherein the textbox 66 is located on a first portion of the display 64a to capture such text. The GUI 64 may be further configured more generally to receive other user input corresponding the user query, such as through an audio capture speech-to-text facility, designated by icon 68. The GUI 64 may include further means to capture user input, such a secondary user input means, such as a secondary textbox 70, which is illustrated as being configured to input a parameter value (e.g., Microsoft Office 2013 as the value for the parameter [package]). It should be understood that GUI 64 may include alternate and/or supplemental input mechanisms now known or hereafter developed.

The GUI 64 is further configured to display the result to the user when it has matched the user query to a predefined pattern question and has determined any needed parameter values, as noted above. Apparatus 10 provides a formatted URL returned by the local EM 14 to the GUI, which operative for navigation to and display of the contents linked by the formatted URL via standard web methods (e.g., as an iframe or an anchor). As mentioned above, in the illustrated embodiment, the GUI 64 may further includes an iframe 72, located at a second portion of the display 64*a* different from the first portion, in which the result is previewed. The first portion of the display 64*a* (i.e., for user text input) and the second portion of the display 64*a* (i.e., iframe to display preview) are displayed and visible to the user simultaneously, thereby providing an interface to allow the user to easily navigate an otherwise complex software product. In an embodiment, the GUI 64 may be configured to recognize a user "click" or other selection of the preview area, wherein the apparatus 10 responds by opening the preview result in its own browser tab.

It should be appreciated that some linked content may not be previewable in an iframe and would be shown as a simple text link. Additionally, the GUI 64 may display a user-selectable button or the like to email a question, answer, and/or link to a desired recipient.

With continued reference to FIG. 5, the GUI 64 is further configured to present other matches in a third portion of the display 64*a*, which is captioned as "Related Topics" section 74, which may be located at the bottom. If additional pattern-form questions matches were returned that had reasonable confidence, the GUI 64 will show them in the "Related Topics" section 74. The GUI 64 may be further configured to present these additional matches of pattern questions as user-selected objects. Thus, if the user clicks on or otherwise selects one, that pattern question becomes the new selected question and the rest of the process is repeated to display the resultant preview in the preview iframe. The "Related Topics" section 74 improves the natural language interface, by offering to users the ability to explore additional areas of the configured domain (e.g., workspace analytics system), thereby increasing usage of configured products and helping the user find portions thereof that they may not have been aware existed.

The embodiment of FIG. 5 shows a single answer mode of operation of the apparatus 10, which is configured to automatically select the top match and to thereafter navigate directly to a display of the result in the preview iframe. In the single answer mode, if parameters (or values thereof) are needed, the GUI 64 of apparatus 10 is configured to prompt the user for such parameters (or values), for example only, by presenting the secondary input textbox 70. In an embodiment, the single answer mode is the default mode, since it is configured to provide an answer to the user's query with a relative minimum of required user input and/or intervention ("automatically").

Figure 6:
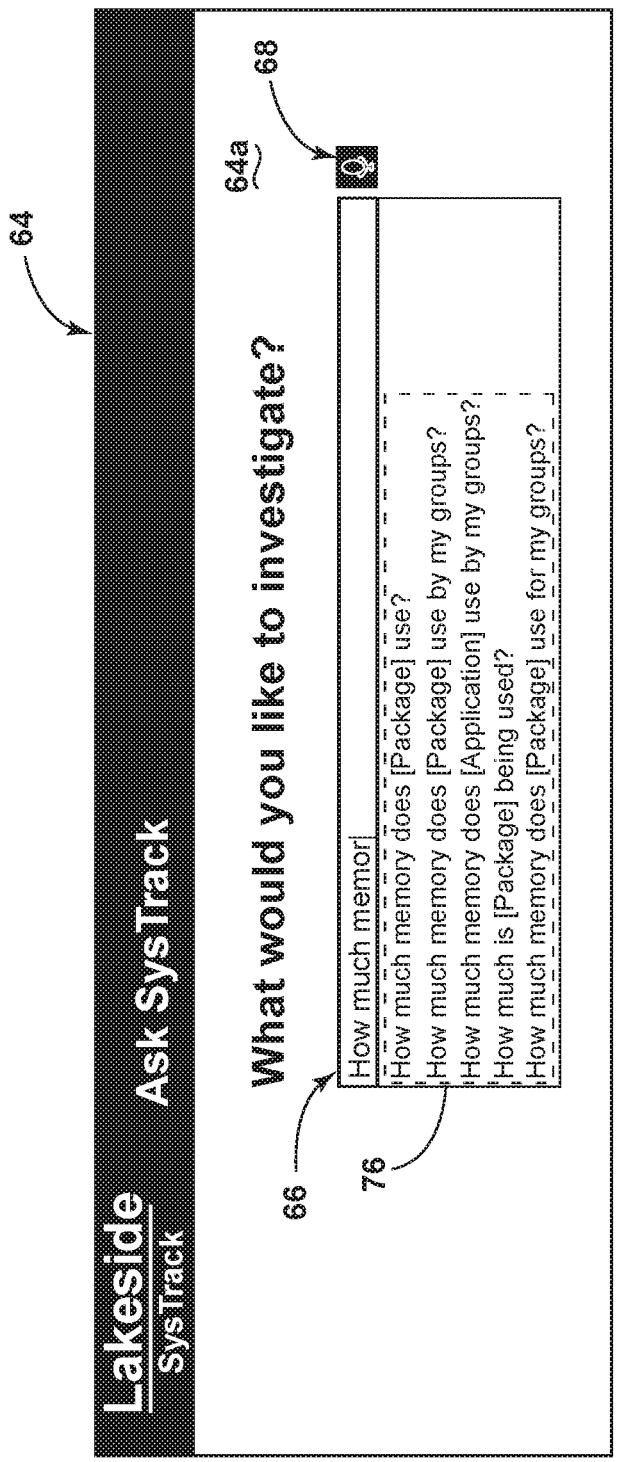
FIG. 6 is a simplified view showing, in an embodiment, a user input capture feature of the GUI of FIG. 6.

FIG. 6 is a simplified view showing a second embodiment the GUI 64, in a type ahead mode. In the type ahead mode, the user-entered input text is immediately and constantly sent to the local EM 14 as the user enters it in the textbox 66. The best matches determined by the local EM 14 are constantly updated and displayed below the input textbox 66. The one or more real-time best matches are shown enclosed in a dashed-line suggestion box 76. The GUI 64 is also configured to make each one of the one or more matches in the box 76 selectable, wherein the user can select one of the suggested matches at any point. The selected best-match from the suggestion box 76 then becomes the selected match. The more input text the user types into textbox 66, the more data is available for analysis, thereby likely improving the matches presented in the suggestion box 76. Once a selection is made by the user, the remainder of the process proceeds as described above.

FIGS. 5-6 also show a speech-to-text facility, which can be initiated by selecting the microphone icon 68 displayed in the GUI 64. The apparatus 10 can be configured to use an external speech-to-text service if the browser being used supports microphone access. In embodiments, Internet browsers, such as FIREFOX, CHROME, and Microsoft EDGE support microphone access, and thus enable use of the speech-to-text facility. In operation, the apparatus 10, through the web page 18 including the GUI 64, streams audio content captured by a microphone to an external speech-to-text conversion service, which returns the text version corresponding to the captured audio content. The apparatus 10, via web page 18, enters the returned text into the user input textbox 66 as though the user had entered it manually with a keyboard or the like. Once the speech-to-text operation has been completed, the apparatus 10 proceeds to perform the operations as described above. As described above, the natural language interface includes the ability to recognize entities mentioned in the user's query. It should be appreciated that the ability to perform entity recognition in a mid-speaking stream provides an advantage in terms of accuracy of the input data, thereby leveraging local entity lists to allow accurate recognition of difficult-to-translate names and other content.

Figure 7:
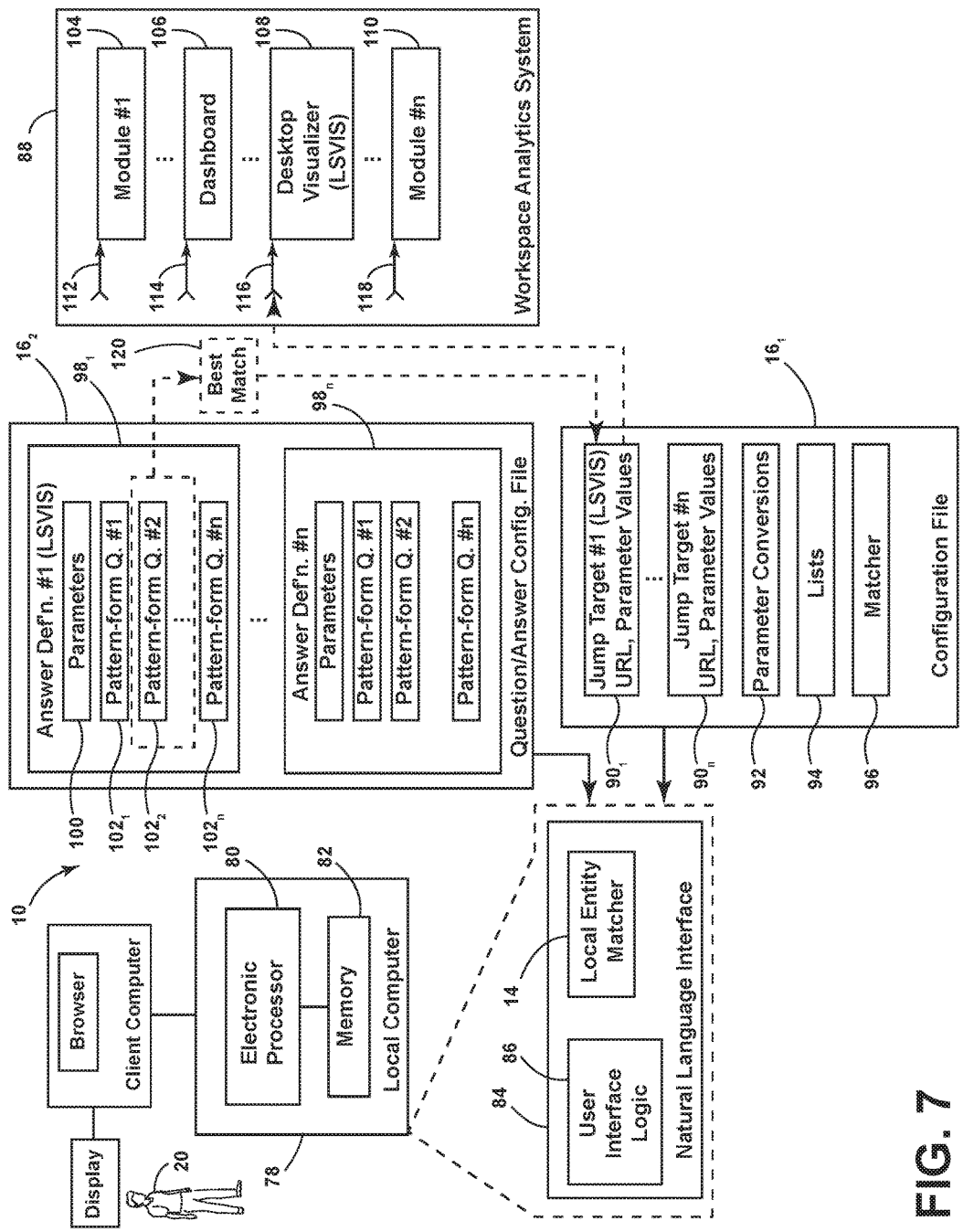
FIG. 7 is a simplified block diagram view showing, in an embodiment, the apparatus for providing a natural language interface of FIG. 1, in greater detail.

FIG. 7 is a simplified block diagram view showing, in greater detail, the apparatus 10 for providing a natural language interface. The apparatus 10 includes a local computer 78 including an electronic processor 80 and a memory 82 and is configured generally to process natural language queries to locate and retrieve/display information that is managed by, for example only, a workspace analytics system or other complex software product.

Processor 80 may include processing capabilities as well as an input/output (I/O) interface through which processor 80 may receive a plurality of input and generate a plurality of outputs. Memory 82 is provided for storage of data and instructions or code (i.e., software) for processor 80. Memory 82 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

Memory 82 stores executable code in the form of natural language interface logic 84, which is configured to control the operation of apparatus 10 in accordance with a desired strategy. Natural language interface logic 84, when executed by processor 80, is configured to process user input text—forming natural language queries—to provide access to information in an external software system. The natural language interface logic 84 includes user interface logic 86 (including GUI 64) and at least a local entity matcher (EM) 14. It should be understood that the user interface—as perceived by a user 20—may be actually rendered by a browser or the like on a remote client computer for display on a locally-connected monitor or the like, as shown in FIG. 7.

Configuration Files.

With continued reference to FIG. 7, the natural language interface logic 84 makes use of configuration files, shown generally in FIG. 1 as block 16. In an embodiment, apparatus 10 may be configurable via a set of text-based configuration files, for example, shown to include at least a first configuration file $16_1$ and a second configuration file $16_2$. In an embodiment, configuration files $16_1, 16_2, \ldots, 16_n$ ($16_n$ not shown) may be located on each entity matcher (e.g., local EM 14 and cloud EM 22). It should be appreciated that apparatus 10 has no inherent knowledge of any particular product or area of inquiry of the target system. However, in an embodiment, the flexibility provided through the use of configuration files allows the natural language interface to be applied to a wide range of target software systems/products or other areas of inquiry.

FIG. 7 also shows a target software system/product, for example, a workspace analytics system 88. The workspace analytics system 88 is a system that collect and stores information with respect to a distributed computer system. It is with respect to the information stored in system 88 that the natural language queries will pertain. The workspace analytics system 88 is externally accessible (generally speaking) at a number of different entry points (e.g., accessible via specific URL, in an embodiment). For example, the workspace analytics system 88 may include a plurality of different modules, such as, without limitation, a first module 104, a dashboard module 106, a desktop visualizer module 108 (hereinafter sometimes "LSVIS"), and an $n^{th}$ module 110. The first and $n^{th}$ modules are generic for purposes of description only. Each module in system 88 may have its own, respective entry point, which is accessed by reference to a respective jump target (e.g., a respective URL in an Internet accessible embodiment). For example, the first module 104 may be accessed via jump target 112, the dashboard module 106 may be accessed via jump target 114, the desktop visualizer may be accessed via jump target 116, and the $n^{th}$ module 110 may be accessed by jump target 118. Each jump target may be refined by the addition of one or more parameter values, which operate to retrieve more particular information from the module. In this respect, while the module being accessed remains the same, varying the appended parameters/values may change the response of the module, like returning different datasets, querying a different entity name, etc.

In an embodiment, the workspace analytics system 88 may be a commercial product available under the trade designation SYSTRACK from Lakeside Software, Inc., Bloomfield Hills, Mich. USA. In an embodiment, the SYSTRACK analytics platform provides enterprise IT with the business intelligence to address a broad set of operational and security requirements, empowering them to make better decisions, dramatically improve productivity and reduce costs. The SYSTRACK analytics platform performs complex IT tasks like user auditing, performance monitoring, change management, event management, latency and end-user experience management, application resource analysis, chargeback, virtualization assessment and planning, application pool design, automated power management, and many others. The SYSTRACK analytics platform provides all of these features in both web report and interactive forms. Further, the SYSTRACK analytics platform integrates many management disciplines into a unique, comprehensive management console. The SYSTRACK analytics platform seamlessly manages virtualized desktops, virtualized servers, terminal servers and physical systems to provide an end-to-end view of the environment. The SYSTRACK analytics platform supports the complete range of deployments, from physical environments to partially/fully virtualized environments, to cloud computing.

The range of answers or results available from the workspace analytics system 88 is or can be known, as is the jump target (URL) that will access such information. Under this understanding, the configuration files may be used to associate, with each of the known answers, a specified jump target as well as one or more pattern-form questions that can be answered by access to system via the specified jump target. When a user query can be matched to one of the pattern-form questions, the apparatus 10 can thereafter determine what the corresponding jump target should be. The foregoing described associations can be configured in advance by way of these configuration files $16_1, 16_2, \ldots, 16_n$. In addition, these configuration files are modular in nature and any number can be setup on a single entity matcher (EM), giving it broader domain knowledge. In an embodiment, the contents of the configuration files may be in an XML format.

The configuration files come in two basic parts: (1) a basic configuration file, such as file $16_1$, which may have a filename format of <config filename>.ask.cfg; and (2) a question and answer configuration file, such as file $16_2$, which may have a filename format of <questions filename>.ask.qa.

The apparatus 10 may be configured to accommodate a plurality of question/answer files $16_2$ that reference a single basic configuration file $16_1$. This arrangement allows information about jump targets and parameters, lists, etc., to be defined once in the configuration file $16_1$ and then shared by different question and answer files $16_2$. For example, a typical configuration file $16_1$ may be configured to define a plurality of jump targets $90_1, \ldots, 90_n$ (e.g., including respective URL's and associated parameters corresponding to certain modules). In addition, the configuration file $16_1$ may include definition of parameter conversion(s) definitions 92, list definition(s) 94, as well as matcher definition(s) 96. The apparatus 10 can accommodate a plurality of configuration file(s) $16_1$; however, these plural configuration files do not reference each other or any other file and each simply acts to define further jump target definitions for corresponding question/answer configuration file(s) $16_2$.

The primary pattern-form (defined) question and answer definitions are contained in the question and answer configuration file $16_2$. This file which contains many pattern-form questions and corresponding answers configured to allow the access to the desired module of system 88. As shown in FIG. 7, the question/answer configuration file $16_2$ may include a plurality of answer definition(s), identified by reference numerals $98_1, \ldots, 98_n$. For example, answer definition $98_1$ includes respective parameter definition 100, and one or more pattern-form questions identified by reference numerals $102_1, 102_2, \ldots, 102_n$. It should be understood that there can be additional question/answer files $16_2$ that also reference the primary configuration file $16_1$. For example, in an embodiment, a first question/answer configuration file $16_2$ may define a basic set of pattern-form questions and the associated jump targets. In a further embodiment, however, a second question/answer configuration file $16_2$ can be provided that contains an advanced set of questions and answers, but still may ultimately define jump targets by referencing the same module(s) in the target system 88. In other words, a basic and advanced question, although existing in separate question/answer configuration files $16_2$, may nonetheless each define the same jump target.

It should be understood that while the instant disclosure makes reference to a workspace analytics system as the example target system 88, the instant teachings are not so limited. In a further embodiment, the configuration files $16_1, 16_2$ may be directed to a third-party software product (not shown), for example, one that is created by a separate third-party apart from apparatus 10 and with no engineered relationship to apparatus 10. However, by creating the appropriate configuration files 16$_1$, 16$_2$, and establishing appropriate jump target definitions for the third-party software product, embodiments consistent with the instant teachings allow integration of the herein-described natural language interface with arbitrary third-party software or other products. In this regard, it should be understood that defined jump target(s) or link(s), while in the form of a URL in an embodiment, are not limited to URLs. In embodiments, and without loss of generality, the jump target(s) (i.e., link(s)) may comprise any mechanism to connect to or otherwise reference a particular resource (e.g., document, file, facility) and/or computer program or entry point into a computer program. Such integration can often be achieved in the field, without re-engineering the third-party product. Embodiments consistent with the instant teachings allow users to pose natural language queries, which through the natural language interface of apparatus 10, can then provide answers supplied by target system 88.

Jump Target Definitions.

With continued reference to configuration file 16$_1$, jump targets may comprise a uniform resource locator (URL) that the apparatus 10 can navigate or jump to for the answer to a user query. In an embodiment, each defined jump target includes a unique "type" value that is used to join the questions and answers in the question/answers configuration file 16$_2$ back to the specified URL definition specified in the configuration file 16$_1$.

For example only, the jump target value "LSVIS" may be used as the type value for referring to the desktop visualizer module 108 of system 88 (Lakeside SysTrack Visualizer product). Any answer that should jump to the visualizer module 108 will reference this type value "LSVIS". Jump target #1 (identified by reference numeral 90$_1$) has a type value "LSVIS" and includes further information that defines the associated URL or navigational reference, which is shown diagrammatically as an entry point 116 to the visualizer module 108 in system 88.

The URL defined in a jump target definition in configuration file 16$_1$ does not need to be unique, although the type string (e.g., "LSVIS") does need to be unique. For example, there may be multiple jump target definitions (i.e., answer types) using the same URL, but keyed by different type values. For example, assume that one set of configuration files is provided by a first party, which contains a jump target to the BING search engine, and further assume that a second set of configuration files is provided by a second party has the same jump target to the BING search engine. Apparatus 10 can accommodate this situation as both parties need their configuration files to be standalone without dependencies on the other party. However, the type value/string must be unique. In an embodiment, a unique prefix may be used by respective parties. For example, ECORP_Bing for the first party and HOOLI_Bing for the second party. Through the foregoing, even where multiple parties wish to call the jump target definition by a type value of BING symbolizing the destination of the jump target, the type value/string for both will still be unique. TABLE 1 below sets forth an exemplary jump target definition as may be contained in a configuration file 16$_1$.

TABLE 1

Jump Target Configuration

```
<targets>
    <target type="LSVIS" display="iframe">
        <serverKey>SysTrack</serverKey>
        <link paramCount="3">
            <url><![CDATA[/visualizer/?vis={vis}&ds={dataset}&per={per}&group=All%20Systems#obs]]></url>
            <display>SysTrack {0} - {1}<display>
        </link>
        <link paramCount="5">
            <url><![CDATA[/visualizer/?vis={vis}&ds={dataset)&per={per)&filterCol={filterCol)&filterVal=
                {filterVal}&group=All%20Systems#obs]]></url>
            <display>SysTrack {0} - {1}</display>
        </link>
        <params>
            <param name="vis" index="0">
                <display>
                    <sql connection="SysTrackDB">
                        <![CDATA[SELECT VISUALIZER_NAME FROM SA_SV_VISUALIZERS WHERE SHORT_NAME LIKE '{vis}']]>
                    </sql>
                </display>
            </param>
            <param name="dataset" index="1">
                <display>
                    <sql connection="SysTrackDB">
                        <![CDATA[SELECT FRIENDLY_NAME FROM SA_SV_DATASETS WHERE DATA_SET_NAME LIKE '{dataset}']]>
                    </sql>
                </display>
            </param>
            <param name="per" index="2">
                <url>
                    <replacement pattern="_" replace="%20"></replacement>
                </url>
            </param>
            <param name="filterCol" index="3">
            </param>
            <param name="filterVal" index="4">
            </param>
        </params>
    </target>
```

In the jump target definition set forth in TABLE 1, note that there can be multiple, different links, based on at least the number of parameters appended to the URL. However, if a link uses fewer parameters than another, they are always the first n parameters—not different ones. So in the definition set forth in TABLE 1 above, one link uses three parameters and another uses five parameters. For the link with five parameters, they are the same first three parameters, plus two additional parameters. The parameter "name" value is the key value used when mapping answer values into the URL template when building the final link. The variant used to generate the final link will depend on the number of parameters supplied by the answer.

With continued reference to FIG. 7, parameters may have conversions applied them, and accordingly, in an embodiment, configuration file $16_1$ may include a parameter conversion definition 92. A parameter value may be shown to the user in the display (e.g., display 64a) in a first way, but added/appended to the URL (jump target) in a second, different way (e.g., a different format or with a different value). For example only, an entity defined in the workspace analytics system 88, called a dataset, may have a text-based name tailored for screen display. However, that value that is adapted for screen display might also be translated for foreign language display so it is not suitable for use as a parameter value to be appended to the URL (jump target). Instead, the URL may require an unchanging dataset internal value (ID). To allow the apparatus 10 to communicate with the user in the user interface using the display string, but still work with the ID elsewhere in the configuration, each parameter can have a display conversion defined, which may be stored in the configuration file $16_1$. An example parameter conversion is set forth in TABLE 2 below, which operates to look up the display string from the internal value (ID) used in the configuration file(s) for the answer.

TABLE 3 is an example of a static list definition for inclusion in configuration file $16_1$.

TABLE 3

Simple List (Company)

```
<simpleLists>
  <simpleList name="COMPANY">
    <items>
      <item>microsoft</item>
      <item>mozilla</item>
      <item>adobe</item>
      <item>google</item>
      <item>nvidia</item>
      <item>vmware</item>
      <item>citrix</item>
      <item>apple</item>
      <item>catalyst</item>
    </items>
  </simpleList>
```

FIG. 7 shows that list definition block 94 may further include a so-replacement list definition. A replacement list definition defines a simple replacement list of items, which definition contains both a pattern to match and a replacement value to use if the pattern is located. An example use for a replacement list is for defining synonyms that are used during the pre-processing of user input text, in order to cut down on the number of training questions needed to cover all possible variations of the same question. It should be understood that any number of replacement lists can be defined, for example, through a list definition stored in the

TABLE 2

Parameter Conversion

```
<param name="dataset" index="1">
  <display>
    <sql connection="SysTrackDB">
      <![CDATA[SELECT FRIENDLY_NAME FROM SA_SV_DATASETS WHERE DATA_SET_NAME LIKE '{dataset}']]>
    </sql>
  </display>
</param>
```

List Definitions

FIG. 7 also shows list definition block 94. The apparatus 10 uses a plurality of different lists for purposes of lookup, matching, replacement, etc., as described herein. Lists can originate from multiple sources, and may be manually defined in the configuration file $16_1$ (as in the illustrated embodiment). Alternatively, the lists can come as SQL or web service calls embedded in the matcher configurations. Relatively small, fixed lists may be defined in the <simpleLists> section of the configuration file $16_1$ and then referenced through the use of a list "name" when such list is needed.

configuration file $16_1$. After the replacement list has been defined, it can be referenced by "name" when needed elsewhere in the operation of apparatus 10.

TABLE 4 set forth below includes a replacement list definition, having the name "SYNONYMS" and establishing a variety of string patterns such as "app" or "program", both of which in this example are replaced by the word "application". It should be understood that multiple pattern strings, when recognized, for example, in the user input text, can be replaced with a single word. This replacement reduces the overall variation seen in the user natural language query (as modified by replacement words) and facilitates matching.

TABLE 4

Replacement List

```
<replacementLists>
  <replacementList name="SYNOMYMS">
    <replacement pattern="app" replace="application"></replacement>
```

TABLE 4-continued

| Replacement List |
|---|
|     <replacement pattern="apps" replace="applications"></replacement><br>    <replacement pattern="program" replace="application"></replacement><br>    <replacement pattern="programs" replace="applications"></replacement><br>    <replacement pattern="RAM" replace="memory"></replacement><br>    <replacement pattern="computer" replace="system"></replacement><br>    <replacement pattern="computers" replace="systems"></replacement><br>    <replacement pattern="machine" replace="system"></replacement><br>    <replacement pattern="machines" replace="systems"></replacement><br>    <replacement pattern="low" replace="low-end"></replacement><br>    <replacement pattern="bad" replace="poor"></replacement><br>    <replacement pattern="weak" replace="poor"></replacement><br>    <replacement pattern="inadequate" replace="poor"></replacement><br>    <replacement pattern="insufficient" replace="poor"></replacement><br>    <replacement pattern="scarce" replace="poor"></replacement><br>  </replacementList><br></replacementLists> |

Matcher Definitions

FIG. 7 also shows that configuration file $16_1$ may contain one or more matcher definitions 96. Matchers definitions 96 are the heart of apparatus 10, which can be used for question matching as well as for synonym replacement, among other things. For example, matchers defined in matcher definition 96 may be used explicitly for identifying parameter values typed in by the user or for suggesting values in the parameter input (secondary) textbox 70. Apparatus 10, in an embodiment, does not require or dictate any particular matcher or matcher definition (although the question matcher is implicitly defined by the configuration—others are optional). However, in an embodiment, a respective matcher definition is defined (i.e., stored in the configuration file $16_1$) for each type of parameter included in the pattern question sets contained in the question configuration file $16_2$. In an example pattern question, which reads: "How much memory does [package] use?", there is one parameter of the type "package" that is included in the pattern question. The parameter name "package" is author defined and must be used consistently throughout the configuration file(s) $16_1$, $16_2$. This approach lets the author of the matcher definition(s) tailor the configuration to their own particular knowledge domain. For the "package" parameter example just described above, the configuration file $16_1$ must be written so as to contain a matcher definition 96 for a "package" parameter.

TABLE 5 set forth below is an example parameter matcher definition.

ciated that the "package" parameter matcher definition can condition the apparatus 10 to return or retrieve from the specified data source (e.g., as shown, that data source associated with the local workspace analytics system 88), a specific list of known software packages—known to the workspace analytics system 88. Through the foregoing, the apparatus 10 can establish an extent of packages or other entity information known in the workspace analytics system.

So, for example, apparatus 10, according to the parameter matcher definition, turns the user input text "How much memory does Microsoft Office use?" into the modified text "How much memory does [package] use?" by replacing a known package "Microsoft Office" with "[package]". Once the parameter matching has been performed, then the user entered input text (question) is made easier to process. When a user entered question is provided, the apparatus 10 will use all defined matchers with class="parameter" looking for parameter replacements prior to trying to match the user question to one of the predefined pattern questions.

In addition to replacing parameters, there is another class of matcher—a "synonym" matcher definition. In an embodiment, the matcher definition 96 may include a synonym replacement definition, an example of which is reproduced in TABLE 6 below. The example synonym matcher definition of TABLE 6 contains a specified matcher name (name="SYNONYMS") having a class "Synonym".

In particular, the example in TABLE 6 defines a synonym matcher that uses the fixed list set forth in TABLE 4.

TABLE 5

| Parameter matcher definition |
|---|
| <matcher name="Package" replace="[Package]" class="Parameter"><br>  <ignore><br>    <list>COMPANY</list><br>  </ignore><br>  <sql connection="SystrackDB" originalColumn="OriginalName" cleanColumn="CleanedName" idColumn="ID"><br>    <![CDATA[ <sql to return the list of known packages with columns called OriginalName, CleanedName, and ID>]]><br>  </sql><br></matcher> |

Each matcher definition has a respective name value associated therewith (e.g., name="Package" as in TABLE 5), which is used as a key to the parameters. The replace value is what the apparatus 10 will replace matches with. In this example, the matcher definition would dictate replacement of any matched packages in a user supplied input string with the following string: "[package]". It should be appre-

TABLE 6

| Synonym Matcher |
|---|
| <matchers><br>  <matcher name="SYNONYMS" class="Synonym"> |

TABLE 6-continued

Synonym Matcher

```
    <list>SYNONYMS</list>
</matcher>
```

Answer Definitions

FIG. 7 shows question and answer configuration file $16_2$, which includes a plurality of answer definitions identified by reference numerals $98_1, \ldots, 98_n$. Each answer definition contains respective parameter definition 100 and one or more pattern-form questions identified by reference numerals $102_1, 102_2, \ldots, 102_n$. It should be understood that answers are a key concept in the operation of apparatus 10. The apparatus 10 is configured to provide a natural language interface whose goal is to display a relevant if not the correct answer to a user's natural language query. In the instant disclosure, an answer may be defined as a specific jump target in combination with a unique set of parameter values. This constitutes an answer because when the specific jump target is formatted in combination with parameter values, the resulting link defines the destination location/entry point with respect to the target software 88 where the answer can be found and retrieved. Thus, any unique combination of a jump target and parameter values form a unique answer.

If a first combination of a jump target/parameter values is the same as a second combination of a jump target/parameter values, then these are duplicate answers. Each unique answer—as just defined—then has a respective list of one or more pattern-form questions associated therewith, where the unique answers provides the answer to the list of pattern-form questions. More pattern-form questions will tend to aid in the matching of the user input text to one of the pattern questions. Once the user supplied question is matched to one of the pattern questions, a specific answer can be identified. At that point, the jump target that the answer references and the parameter values the answer encodes, are sufficient to generate a formatted jump target (formatted URL), which can be displayed to the user.

TABLE 7 set forth below provides an example of answer definition.

application (i.e., "How much memory does Microsoft Office use?"). A match of the user query to any of the pattern questions defined in this answer definition will result in the same "answer", wherein the "answer" is the specified jump target the "LSVIS" jump target.

For example, assume that the user query best matches the pattern-form question #2, which is identified by reference numeral $102_2$ and is enclosed in a dashed-line box. What constitutes a "best match" will be described below; however, the "best match" is shown by box 120. The "LSVIS" jump target, in an embodiment, is defined in the jump target definition $90_1$ which is contained in basic configuration file $16_1$. There is linkage in the apparatus 10 established through these definitions. The jump target definition includes the URL and the relevant parameters and values defined in the parameters section and will be used to generate the final, formatted URL. In this example, the formatted URL links to the entry point 116 of the target software system 88 (i.e., the desktop visualizer module—"LSVIS"). This path from the pattern-question in file $16_2$, to the jump target in $16_1$, and to the target module in the system 88, is overall shown by a dashed-line.

Questions.

Questions appear as a core concept in the operation of apparatus 10. However, such pattern-form question can be considered training patterns to help match the user input text to the correct (or best) answer. The answer is a core concept described above. Pattern form questions represent, in an embodiment, variations of how a user might ask for a certain answer. In general, the more examples that are provided—the more pattern form questions—the higher the confidence can be in the matches.

There are two aspects of pattern-form question authoring that allow correct matching without requiring as many training questions to be provided. The first aspect is the use of synonym replacement, as described below. If so configured, apparatus 10 will replace synonyms in the user input text prior to matching. Where there are several common variations of a word, the training author does not need to provide every variation of the question. Rather only one variation of the pattern-form question is required, but

TABLE 7

Example answer definition

```
<answer target="LSVIS" description="Desktop Visualizer SV_PACKAGES-3 Filter on PACKAGENAME">
    <parameters>
        <parameter name="vis" type="Fixed" value ="Desktop" />
        <parameter name="dataset" type ="Fixed" value="SV_PACKAGES" />
        <parameter name="per" type="Fixed" value="3" />
        <parameter name="filterCol" type="Fixed" value="PACKAGENAME" />
        <parameter name ="filterVal" type="Input" matcher="Package" />
    </parameters>
    <questions>
    <question><![CDATA[How much memory does [Package] use?]]></question>
    <question><![CDATA[On average, how much memory does [Package] use?]]></question>
    <question><![CDATA[What is the standard deviation of average memory consumed by [Package]?]]></question>
    <question><![CDATA[What is the minimum average memory consumed by [Package]?]]></question>
    <question><![CDATA[What is the maximum average memory consumed by [Package]?]]></question>
    <question><![CDATA[How much memory does [Package] consume while active?]]></question>
    </questions>
</answer>
```

The answer definition in TABLE 7 not only specifies what parameter(s) are applicable, but in addition also defines one or more of the associated pattern-form questions. Further, the example in TABLE 7 constitutes the answer definition for the user query used as an example above in this patent coupled with a list of synonyms for the subject word used in the pattern-form question. For example, if a question is about a "computer" and it could be referred to as a "system" or a "machine", the author must only provide a pattern question containing the word "computer" as long as the configuration file is also provided with a list of synonyms for "computer", such the synonyms "system" and "machine".

Training.

The apparatus 10 requires no training beyond being given access to a valid list of pattern-form questions for the known answers in a knowledge domain, for example, via access to the configuration files 16$_1$, 16$_2$. Questions are written in a form similar to one a user might ask. Training uses distinct language in order to include all of the material and/or information that may be available in the workspace analytics system 88. Every dataset contains numerous questions that will point users to that dataset when asked for.

In a workspace analytics system embodiment (e.g., using SYSTRACK analytics platform), datasets are basically divisions of data in one of the SYSTRACK applications (Visualizer). There are datasets for hardware, software, people, web usage, etc. Nothing in the natural language query system of apparatus 10 knows about datasets (at least not inherently). The datasets constitutes data divisions that just happen to be URL-addressable areas in one of the SYSTRACK applications. Accordingly, datasets can be used as parameters in the answers for a particular application. Other targets (e.g., other SYSTRACK applications or third party apps) would not have a dataset reference anywhere in the answer. In most cases, for the purposes herein, a "dataset" may be used to mean a specific page in a SYSTRACK tool, called Visualizer, that is addressable via a specific URL.

In an embodiment, extensive training (question authoring) can be required in order for the natural language interface provided by apparatus 10 to work accurately, due in part to the complexities of the English language and the ability of the user to ask what is effectively the same question in many different ways. In this regard, the pattern-form questions should be authored with precision and be comprehensive— to make sure all areas of information provided for in the workspace analytics system 88 are included as possible answers. In an embodiment where the domain of possible answers can be described as a matrix, the pattern-form questions may be produced according to a baseline model of one or two questions per data column. However, this approach can be deviated from in order to cover all content. It should be emphasized that every prepared question will be associated with a respective jump target. In an embodiment, each perspective available in the various modules of the workspace analytics system (e.g., in the Visualizer module 108, Dashboard 106, and App Vision tools) contains its own jump target, along with different jump targets for each dashboard.

In a workspace analytics system embodiment (e.g., using SYSTRACK analytics platform), modules refer to particular parts of the SYSTRACK application. For example, the "Resolve" module is the user part of the platform used to troubleshoot or explore data on a particular customer machine. It can be thought of as a "help desk" kind of application and used by the customer's internal IT support staff. It makes use of the standard SYSTRACK data, but is tailored to show just one machine. Visualizer is another module, but this one has a user interface (UI) tailored to showing summary information about all systems at a customer site. The UI is further subdivided into different areas of information called datasets (e.g., see above description of datasets). A dataset will contain many columns of data for each row. For example, the Hardware dataset may contain thirty columns of data where the rows are individual known system and the columns are the bits of information that the SYSTRACK analytics platform knows about the "hardware" of each system.

Because there are a large number of columns, for UI purposes in Visualizer, they are grouped into Perspectives where the Perspective is something like "OS details". In that example, only the columns that pertain to the OS are displayed to the user. So Datasets and Perspectives are ways to narrow down what is shown in the Visualizer module. So if the jump target is Visualizer, then two additional parameters can be specified in order to further enhance the URL so that the Visualizer module starts with the correct Dataset and Perspective selected for the user. By comparison, the Resolve module does not have the concept of Datasets or Perspectives. Rather, this module needs to know which individual computer to focus on, and then which particular page (out of roughly a dozen in the module) to show. So the parameters in its jump target/URL are system ID and the page to show information for.

In regard to the expected queries, users will often ask questions concerning a particular item, such as a distinct application, a user, a software package, and/or a host. In order to account for this variation in the entity specified by the user, many pattern form questions can include a generic parameter instead of a specific entity name/value. The generic parameter term will, after matching, be substituted with the user's requested item. This feature allows for the expansion of power available from workspace analytics system 88, and makes it much more useful to the everyday user. In an embodiment, this feature requires that many questions be similarly added twice to the configuration lists, one not including a parameter and one that does include a generic parameter (e.g., "How much memory is used?" and "How much memory does [Package] use?" where [Package] is the generic parameter). This slight difference is enough to avoid the duplicity problem, stated above (i.e. the situation in which the same question is added to the Answer definition several times wherein the only difference between such questions would be the specific parameter). Using the two-question approach (no parameter/generic parameter) can be sufficient in very many instances.

As shown in FIG. 1, an external entity matcher 26 may be accommodated with respect to the apparatus 10. In an embodiment, an external entity matcher 26 may be a commercially available product under the name WATSON cognitive technology, International Business Machines Corp., Armonk, N.Y., USA. An external matcher may require a discrete "training" process to be run, and supplemented whenever new features or access to new "answers" become available as part of the workspace analytics software product 88. In alternate embodiment, other third-party matchers may be used. For example only, other companies offer solutions similar in function to WATSON, which could also be used to fill the purpose of external matcher 26, including Google Analytics tools and Microsoft Cortana tools.

Although an external entity matcher, such as the IBM WATSON facility, assists with deciphering the users' input text, such an external entity matcher resolves the input text typically to the degree of the available training (pattern-form) questions. To address this relationship and possible limitation, the number of training questions should be increased, which will allow the external entity matcher (e.g., IBM WATSON) to find a closer match, thereby providing a higher chance that the user will be guided to the correct page in the workspace analytics system 88. However, it should be understood that the same training questions (i.e., pattern-form questions) should not be entered multiple times into the training file (configuration file). In an embodiment, doing this would cause problems in the "Related Topics" area of the GUI 64 (best shown in FIG. 5). Under this scenario, if the user was pointed to one of the duplicate questions, then other duplicate question would be the first suggestion under the "Related Topics" area, causing confusion. A training approach where additional, non-duplicate training questions are authored strikes the balance between giving the external entity matcher (IBM WATSON) facility enough content to match with the user's question, without overlapping in phrasing and subject.

Corrections/Updates.

The existence of the cloud EM 22 allows new question patterns to be added instantly for all users of apparatus 10 and its natural language interface, without the need for an on premise update. Because the local EM 14 is configured to ask the cloud EM 22 for matches if it is unable to find a good match locally, the configuration base of pattern questions can be enhanced by first updating the cloud EM 22 with new pattern-form questions based on the user query. As long as the new pattern-form questions relate to an existing answer, they can be added at the cloud EM layer 22.

In an embodiment, new questions can be created by a human, based on the match data gathered by the apparatus 10 as described below. In an alternate embodiment, apparatus 10 may be configured for automated question generation—an extension given the human question and some indication of what an appropriate answer might be. As alluded to above, an enhanced feedback feature is provided which can be used for human-based development of pattern form questions. In an embodiment, when the user is presented with the top answer for their question, the apparatus 10 can be configured to capture a rating specified by the user, for example, the user can rate that answer from 1-5 stars. The apparatus 10 is configured to record this user-specified rating, along with the question, answer, and confidence, where this recorded record can later be used by a human author to create or modify the questions that led to, for example, low rated answers.

This unique feature allows additional questions to be added to assist in matching it is noticed from cloud traffic that certain questions are being asked that consistently find no good matches. In an embodiment, a method of updating the configuration file $16_2$ includes logging questions with match confidence lower than a predetermined threshold, and then authoring pattern-form questions, based on the logged user questions, at predetermined intervals. For example, for the next product update of system 88, the new content can be included in the release and the local EM 14 will then have the new questions as well and not need to try the cloud EM 22. But in this manner—use of a constantly updated cloud EM 22, new content can be made available instantly to all customers.

In some embodiments where the updates (e.g., new questions or contents) actually require a new answer, apparatus 10 is configured with a mechanism to inform the user that there is new content available that will answer the question they just asked, and direct them how to get such new information this—mechanism and options will be described below in greater detail below.

Finding an Answer.

Answers are the core concept in apparatus 10. The apparatus 10 is configured to know what answers it can provide, so directing users to the best answer to their question is the primary task. The apparatus 10 does not assure or guarantee that there is an exact answer to every question posed by the user. Rather, apparatus 10 operates on the basis that there is a defined set of answers available and that the apparatus 10, through the natural language interface, should guide the user to the best answer for the user's question. Additionally, it should be appreciated that there may be several good answers to the user's question, so showing the user additional answers (e.g., "Related Topics") will facilitate guiding the user further into additional information that the user perhaps did not know existed or perceive as being relevant.

The apparatus 10 executes a matching process to provide accurate matches to arbitrary user input, all in real time. The apparatus 10 uses a number of matching mechanisms, which will be described below.

Pre-Processing.

When the user 20 provides input text corresponding to a natural language query, the captured text is preprocessed before the matching process begins.

Additionally, the pattern questions and matcher lists are preprocessed in a similar fashion before matching. Pre-processing makes the user input text more generic. Due to possible spelling errors and grammatical differences in the user input text, the matching process does not rely on exact matches on string comparisons, but rather on "fuzzy matching" using several algorithms. In an embodiment, fuzzy matching is enhanced when all non-essential information (text) is removed from both sides of the comparison (e.g., comparison of user input text side with the pattern-form question). Also, apparatus 10, if so configured, replaces pattern words with synonyms to further enhance the matching. Finally apparatus 10 is configured to scan the input strings for known entities described in a matcher definition, which, if found, may be replaced by a common, predefined string.

Synonym Replacement.

Synonym replacement allows apparatus 10 to perform matching using a reduced level of variations with respect to the questions that should have the same answer. For example, "How many machines have Microsoft Word installed?" and "How many systems have Microsoft Word installed?" are fundamentally the same question. In an embodiment, the pattern-form questions included in the answer definition typically select one variation from a group and use that consistently. For example, assume the pattern question in an answer definition picks the word "system" as the term to use for a computer. The configuration file would then include a list of synonyms for "system" that might include, for example, "machine" and "computer".

When the user input text (string) is received, the first step of pre-processing is to replace any defined synonyms in the input string with the defined replacement term. In the example above, any known variations for the term computer will still end up after replacement as "How many systems have Microsoft Word installed?"

Words to Ignore.

Matcher definitions can also contain an optional list of words to ignore. Apparatus 10 is configured to ignore the list of ignore words when matching, which can improve matching scores assuming both sides of the comparison are removing the same words. It should be understood that while the configuration author defines the words to ignore for a given matcher, the apparatus 10 ensures that they are applied to both sides of a comparison when in use. Selecting words to ignore is a studied process that involves carefully examining the entire set of matcher items and determining which words do not help differentiate between items to any desirable extent. An example list of words to ignore is set forth below in TABLE 8, pertinent when dealing with software package names.

TABLE 8

Word to ignore

```
<simpleList name="PACKAGEAPPIGNORE">
  <items>
    <item>edition</item>
    <item>suite</item>
    <item>program</item>
    <item>exe</item>
    <item>win</item>
    <item>en</item>
    <item>file</item>
    <item>for</item>
    <item>version</item>
    <item>ver</item>
    <item>bit</item>
  </items>
</simpleList>
```

In an embodiment, the content of the word to ignore list can be based on the content (e.g., entities) contained or under the management of the workspace analytics system 88 or more generally the knowledge domain of any other target system being accessed through the natural language interface. It should be understood that such knowledge domain based words to ignore lists can have a relatively large impact on resulting matching scores.

Cleaning (Generally).

Apparatus 10 is further configured to perform initial cleaning steps to remove unimportant aspects of a string in order to leave the core part prior to comparison for better matching. Different cleaning happens in different parts of apparatus 10, which will be described below.

Cleaning—Defined Questions (Pattern-Form).

The defined questions have minimal cleaning applied as it is assumed the author is writing conformant questions in the first place. Nonetheless, apparatus 10 is configured to clean the defined questions (i.e., pattern-form questions included in the answer definitions in configuration file $16_2$) by performing the following steps: (1) removing any trailing punctuation; (2) tokenizing the entire string; and (3) looping through the tokens while doing the following:

(a) if the token was quoted in the original string, add the value to the output after removing any whitespace;

(b) if the token is a parameter (e.g., [package]), remember the location in the string but do not add the parameter itself (e.g., [package]) to the output;

(c) if the token is only one character long, ignore it;

(d) if a regular token, remove non-alpha characters from the token and add the result to the output.

Apparatus 10, through the foregoing cleaning steps, produces a result that should be a string with no white space, contains no parameters, and contains no non-alpha characters unless such non-alpha characters were quoted in the original string.

Cleaning—Parameter Matcher Items.

Apparatus 10 is further configured to clean items that will be loaded into a matcher using a similar cleaning process as described above in connection with the defined questions. However, apparatus 10 operates as follows: the "words to ignore" are not included in the output during the token reconstruction process—they are simply ignored and will not be part of the cleaned output. Apparatus 10, through the foregoing cleaning steps, produces a result that should be a string with no white space, contains no words to ignore, and contains only alpha characters.

Cleaning—User-Entered Questions.

Apparatus 10 is configured to subject the user input text to the above-described synonym replacement process, which homogenizes the queries (as between a plurality of queries). Apparatus 10 is also configured to further subject the resulting user input text to substantially the same cleaning process as was described above for the defined questions. As a result, the modified user input text (query) should be as similar as possible to the defined questions in terms of format.

Cleaning—Entity Detection.

In some cases, apparatus 10 will subject the user entered questions to an additional cleaning step, described as follows. When neither the local EM 14 nor the cloud EM 22 find a match that meets a definable threshold, apparatus 10 is configured to ask the external matcher 26 to look for matches. However, before sending the user entered question to the external matcher 26, the cloud EM 22 will use all configured matchers of class "parameter" to search for and replace matching entities with the replacement value.

For example, if the user input text was "How many machines have Microsoft Word installed?", and a matcher definition for "package" has been defined in the configuration file, and the list of items in the matcher definition contains terms that match "Microsoft Word" with enough confidence, then the replacement process would result in "How many machines have [package] installed?" Apparatus 10, through configuration via the matcher definition, is configured to parameterize the user's question to contain the [package] parameter. This replacement in the user's question, before the user's question is sent to the external matcher 26, increases the probability of a match.

Matching (Generally).

As described above, the concept of answers are central to the operation of apparatus 10 and the natural language interface provided therefore. The concept of matching is a core process in the operation of apparatus 10. As described above, pre-processing steps are contemplated, for example, where such pre-processing of the string is adapted to improve the downstream matching process. It should be understood that exact strings are easily matched.

However, apparatus 10 is configured to accommodate user input text presented in a natural language form, which can be subject to misspellings of words, phrasing and grammar differences, incorrect or incomplete data, or even a properly presented question for which there is literally no answer. To ensure accurate matches leading to the "best" answer, with assumed bad input data, apparatus 10 may be configured to employ, in an embodiment, one or more "fuzzy matching" approaches. In an embodiment, apparatus 10 may rely on both internal matching algorithms as well as external matching systems, as described below.

Matching (Questions without Parameters).

Apparatus 10 is configured to perform internal question matching using, in an embodiment, a cascade approach. In an embodiment, all match scores may reside on a scale extending from zero (i.e., indicating no match) to one (i.e., indicating a great match). The general matching cascade algorithm is set forth below.

The initial step (i.e., first approach) involves scoring the two strings being compared for matching purposes by determining the so-called starting string similarity. Evaluating the starting string similarity involves a couple of sub-steps. The first sub-step involves (a) determining the length of the matching characters at the beginning of the string, and (i) determining the length of the shortest string and (ii) returning the number of characters that match exactly at the beginning of both strings where zero is the minimum and the length of the shortest string is the maximum. The second sub-step involves (b) returning a starting string similarity score as:

Min(Max(1+Log 10(match length/longer string length),0),1).

Example

Assume the terms "app" and "application" are being evaluated using the starting string similarity relationship noted above. The starting string match length in this example is three and the longer string length is eleven. Evaluation leads to the following:

Min(Max(1+Log 10(3/11),0),1)

Min(Max(0.435,0),1)

Min(0.435, 1)→results in a starting string similarity score of 0.435.

Example

Further assume the terms "office" and "officepro" are being evaluated using the starting string similarity relationship. The starting string match length in this example is six and the longer string length is nine. Evaluation leads to the following:

Min(Max(1+Log 10(6/9),0),1)

Min(Max(0.823,0),1)

Min(0.823,1)→results in a starting string similarity score of 0.823.

The apparatus 10 produces a match score (starting string similarity score) as a result of the evaluation of the two strings. This score is compared with a predetermined threshold to determine the degree of match. In an embodiment, if the starting string similarity score is less than or equal to a first predetermined threshold (e.g., 0.7), then further evaluate the two strings according to a first alternate matching algorithm, otherwise include the possible match and its match score in a list of "best matches". For example only, the first alternate matching algorithm (i.e., second approach) may be a conventional matching algorithm, such as the known Sørensen-Dice coefficient approach (hereinafter "Dice Coefficient"). The Dice coefficient, as known, involves breaking down input strings into two letter pairs called bigrams and then comparing the resulting bigrams for the two strings to be compared. A score (0-1) is determined using the number of bigrams that are found in both strings. The more matches, the closer the score approaches one (1). Thus, when the starting string similarity score is less than or equal to a first predetermined threshold (e.g., 0.7), the apparatus 10 scores the two strings by Dice Coefficient.

In the case where the alternate matching approach (Dice Coefficient) is used, then if the Dice Coefficient score is greater than the Starting String Similarity score, then apparatus 10 uses the Dice Coefficient score.

After the forgoing approach has been performed, if the best score achieved through any of the branches in logic above is greater than a second predetermined threshold (e.g., >0.1), then add the possible match(es) with its score to a match list. Note the relatively low second threshold, only indicating that at least some minimal amount of match is present (but must be more than zero to make the list).

Finally, the apparatus 10 may sort possible matches on the list mentioned above by score (descending order). Through the foregoing, the highest (best) matches will appear at the top of the best matches list while the weaker matches will appear at or near the bottom of the list.

Matching (Questions with Parameters).

For comparing the user input text to a defined question that contains a parameter, it is assumed that the user did not enter the parameter in a generic sense (e.g., like [package]), but rather entered the actual value of the parameter in the question. For example, if the user entered question is "How many machines have Microsoft Word installed?" and the defined question being tested for a match is "How many machines have [package] installed?", that should be a high confidence match and the user intended that "Microsoft Word" constituted the value for [package]. To handle this matching, apparatus 10 is configured to make use of at least part of the information stored about the parameter in the defined, pattern-form question (i.e., where the parameter was located in the string) when the defined question was cleaned as part of its pre-processing.

In an embodiment, apparatus 10 is configured to perform the matching algorithm, which includes the following steps. The initial step involves tokenizing the user's input string, and then rebuilding it using the number of tokens from the beginning of the input string that match the number of tokens prior to the parameter in the defined question (pattern-form question). The next step involves adding the number of tokens from the end of the user string that is equal to the number of tokens following the parameter in the defined question.

For example, consider the defined question: "How many machines have [package] installed?" The parameter is "[package]" and the string has four tokens before the parameter "[package]" and one token following the parameter "[package]". Assume that the user has entered the following string: "How many machines have Microsoft Word installed?" This string has seven total tokens. Using the matching algorithm described above results in taking the first four tokens and the last one token of the user supplied string and combining these tokens to obtain "howmanymachineshaveinstalled".

The defined question with which the user supplied string (as modified in the preceding paragraph) is first subjected to pre-processing as described above. As a result, the parameter [package] is dropped and the white space is removed, wherein the defined question (as cleaned) is transformed into: "howmanymachineshaveinstalled". In other words, the pattern removal can be thought of as a pre-processing step that helps determine words to ignore in the input string, based on the parameter pattern in the question to be tested against.

The apparatus then compares the two strings, for example only, in accordance with the cascade approach described above for questions without parameters (e.g., one approach such as starting string similarity and a further approach such as determining Dice coefficient). When this is done, the two strings are compared and achieve a perfect match score.

Finally, the process of combining the initial user entered question into a string depending on each question being tested, can be time consuming. However, it can be seen that there are a relatively limited number of pre and post token lengths involved, so as each is combination is constructed, it can be cached temporarily and re-used when another defined question with the same ratio is encountered.

To elaborate on the above, a ratio is a string that is used as an identifier. For example only, a defined question that includes four (4) tokens from the front of the parameter and one (1) token after the parameter can be characterized by the ratio "4:1". Likewise, another defined question may be characterized as by the ratio "3:2", meaning three (3) tokens from the front and two (2) tokens from the end. The ratio can be associated with each defined question and tracked. Further, over the totality of all the defined questions, it may be observed that one might find on the order of only several different ratios. Based on the foregoing, as the comparison progresses, the apparatus 10 generates a so-called ratio version of the user input string based on the ratio of the encountered pre-defined question currently being assessed. As further pre-defined questions with different ratios are encountered, different ratio versions of the user input string are generated. These different versions of the user input string (e.g., a 4:1 ratio version, a 3:2 ratio version, etc.) are saved in memory when they are created, for the purpose of later use. This caching action saves time because, for example the respective 3:2 and 4:1 ratio versions of the user input question will be the same regardless of the defined question against which they will be compared. Thus, if the defined question is a 3:2 ratio and apparatus 10 has already generated and saved the 3:2 ratio version of the user input question, then the apparatus 10 is configured to go ahead and directly use this already-generated 3:2 ratio version of the user input question. Alternatively, when the apparatus 10 encounters a defined question with a ratio not before encountered—there will be no saved ratio version of the user input question to retrieve. The apparatus 10 will therefore just generate the needed ratio version for purposes of the current comparison, but will also save it in case another pre-defined question with this same ratio is subsequently encountered. The apparatus 10 may store the different ratio versions of the user input question in a table or the like where each entry (e.g., row) corresponds to a different (unique) ratio version.

Entity Matching.

Entity matching involves locating a known entity inside of a user entered question string. Recall that an entity refers to an entity—an item of information known to the workspace analytics system 88, such as a software package name, user name, computer name, etc. Consider the user supplied question: "How many machines have Microsoft Word installed?". The apparatus 10 is configured to perform an entity matching process to locate the entity "Microsoft Word" that is in the user question from a list of known entity items in the package matcher (described above). The apparatus 10 is configured to handle various unknowns, namely, an unknown with respect to where in the input string an entity value might be positioned, and/or another unknown with respect to how many tokens such an entity value may comprise. The matching algorithm performed by apparatus 10, in an embodiment, includes a number of steps, as is described below for the example user query, "How many machines have Microsoft Word installed?" where the word "Microsoft" is included in the ignore word list. The method proceeds as follows:

The first step involves tokenizing the user input text, which results in seven tokens.

The next step involves generating all unique consecutive token combinations whose length varies between one and, for example only, three tokens long, and that are not in the ignore word list. For example, some of the combination include "how", "how many", "how many machines", "many", "many machines", "many machines have", "have", . . . , "Word, "Word installed", . . . .

The next step involves finding, for each combination, matches in the matcher items with confidence level (or score) greater than or equal to a threshold level (e.g., 0.7). This may involve a number of sub-steps, comprising (a) finding all matcher items with the same Soundex code, (b) finding all matcher items with the same Metaphone key, and (c) if it is a close match, return it with a confidence score, as follows: (i) using the starting similarity score, return the matching entity and its score when the starting similarity score is greater than a predetermined threshold (e.g., >0.5); (ii) using a calculation of the Dice Coefficient, as described above; (iii) using a calculation of the EditDistanceCoefficient; (iv) if both scores are greater than 0.5 return match and scores; (v) If both scores are less than 0.2 return no match; (vi) if metaphone keys are similar, return match and Dice Coefficient score (noting that similar if one starts with the other or vice versa).

The next step involves increasing the count of token combined by one if a match is exact (confidence 1.0). For example, "word" is one token, so if it was matched exactly, then claim it is two tokens for ranking to come.

The next step involves sorting the matches at each starting token position by token count and confidence. This involves two sub-steps.

The first sub-step: In the example above, "how", "how many", and "how many have" all have the same start token. The method implements a preference for the best match and that also matches the most tokens. Thus, assuming the same match score, the preference will go to the match with more tokens. For example, a 0.8 score that matches "how" and a 0.8 score that matches "how many installed", results in the preference going to "how many installed"—this is the currently preferred token combination.

The second sub-step: in the case of a tie, use the starting similarity matching approach described above on the original (not cleaned) string as it preserves more content than the cleaned strings used for everything else.

Both the Soundex and Metaphone procedures are well defined public algorithms known to those of ordinary skill in the art. Generally, both the Soundex and Metaphone approaches take an input string and generate a few character code for that string. The codes are not unique so many strings will generate the same code. For example, the Soundex code for the word "system" is S235. The codes are generated based on phonetic patterns in words so that similar sounding words end up with similar or identical codes. This approach is useful in embodiments to match user-inputted words that are misspelled, but close to correctly spelling the desired/intended word. Metaphone codes are very similar but the procedure was developed to improve Soundex codes by building in sounds in names from their native tongue. Metaphone codes are all letter codes, for example, the Metaphone code for "system" is SSTM.

While entity matching in one embodiment described above employs the Soundex and Metaphone algorithms, an alternative embodiment is also provided that omits their use. In particular, in an alternate embodiment, apparatus 10, when trying to match entities, first evaluates the degree of matching using the starting string similarity approach already described above. Next, if the confidence score is <=0.7, then apparatus 10 is configured to further evaluate the degree of match using the Dice Coefficient, also as already described above. If the Dice Coefficient score is higher than the starting string similarity score, then apparatus 10 is configured to count the Dice Coefficient score as the confidence on the match. Otherwise, the starting string similarity score is used. If assessments under these two approaches end up with a tied score, the original uncleaned strings are scored (repeat Starting String Similarity then Dice Coefficient) on the grounds that perhaps in the cleaning process, some unique information was stripped. For the comparison (uncleaned), the confidence score is the starting string similarity score if such score is greater than about 0.5 (in an exemplary embodiment), otherwise the confidence score will be the Dice Coefficient score if it is greater than about 0.5 (in an exemplary embodiment).

External Matching.

In some cases, when neither the local EM or the cloud EM finds a match with a high enough confidence score, and the system is configured to use an external matching service, e.g., like IBM WATSON noted above, the user supplied question will be sent to the external matching service for a final evaluation. In some instances, the external matching service can enhance the matching process, especially with some difficult cases. The results of the external matcher are returned to the cloud EM 22 and then combined with the cloud match results in order of confidence, described above generally in regard to FIG. 4.

Figure 8:
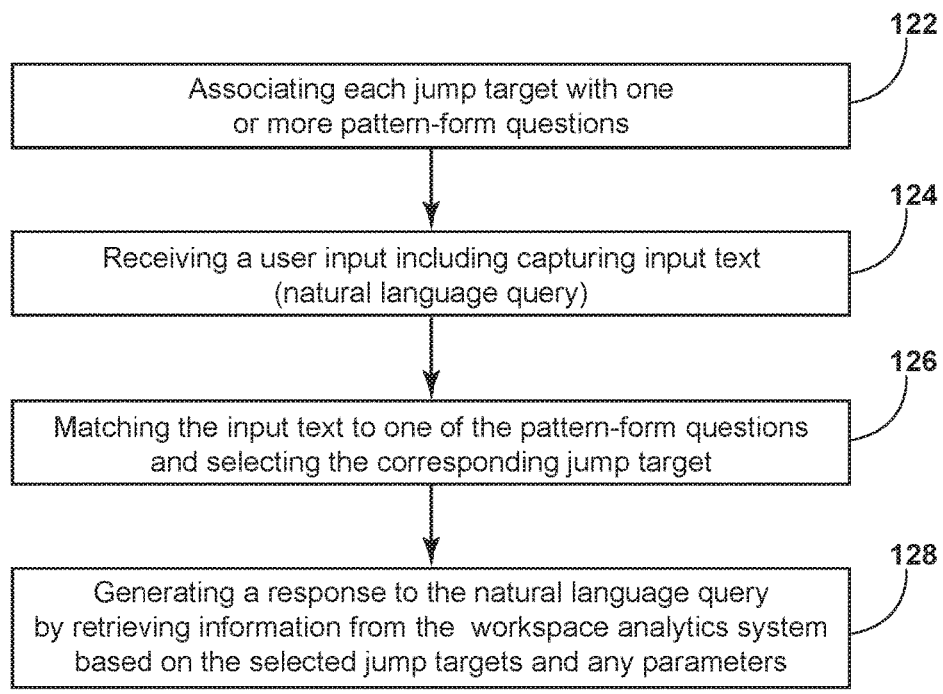
FIG. 8 is a simplified flowchart diagram showing a method of operation of the apparatus of FIG. 7.

FIG. 8 is a simplified flowchart diagram showing a method of operation of the apparatus for providing a natural language interface. The method begins in step 122.

In step 122, the method involves associating with each answer definition (i.e., which maps to a jump target into a workspace analytics system), at least one or more pattern-form questions. Each jump target into the workspace analytics system provides a respective "answer" (i.e., information) to the associated one or more pattern-form questions.

In step 124/ the method involves receiving a user input including capturing input text wherein the input text defines a natural language user query.

In step 126, the method involves matching the received input text to one of the pattern-form questions, thereby selecting the corresponding jump target associated with the matched pattern-form question (or questions).

In step 128, the method involves generating a response to the natural language user query by retrieving information from the workspace analytics system based on the selected jump target as well as any corresponding parameter values.

Figure 9:
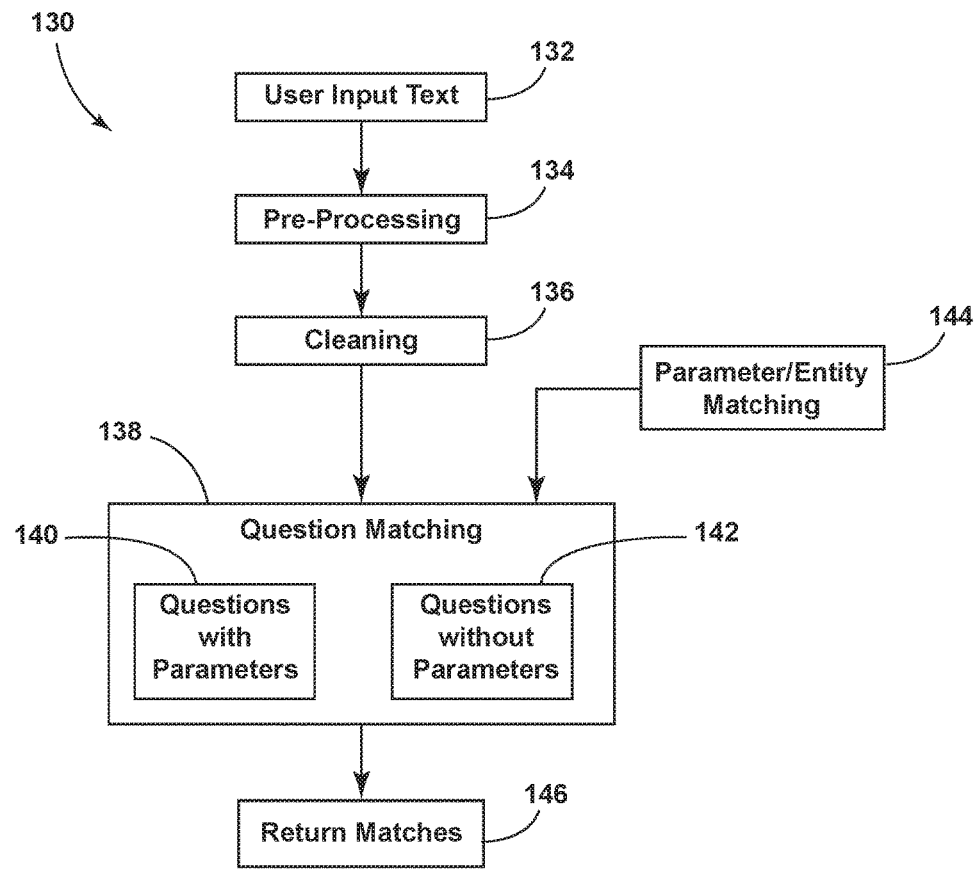
FIG. 9 is a simplified flowchart diagram showing a method of handling user input text corresponding to a natural language query.

FIG. 9 is a simplified flowchart diagram showing a method 130 of handling user input text corresponding to a natural language query. The method begins in step 132.

In step 132, the apparatus 10 is configured to obtain user input, for example, user input text by way of keyboard or other input such as speech-to-text as described above. The method proceeds to step 134.

In step 134, the apparatus 10 is configured to pre-process the user input text. In an embodiment, the user input text may be pre-processed substantially as described above. The method proceeds to step 136.

In step 136, the apparatus 10 is configured to clean the pre-processed user input text. In an embodiment, the pre-processed user input text may be cleaned substantially as described above. The method proceeds to step 138.

In step 138, the apparatus 10 is configured to match the pre-processed, cleaned, user input text ("natural language query") to one of the plurality of pre-defined pattern-form questions already defined by virtue of the above-described answer definitions. In an embodiment where the user NL query contains no parameters (block 140), the match assessment process is performed substantially as described above. In an embodiment where the user NL query contains a parameter (block 142), the presence of such parameter has been determined by block 144. Operation of both blocks 142, 144 may be substantially as described above. The method proceeds to step 146.

In step 146, the result of the matching in step 138 is returned, for further handling as described above.

Several additional features of the instant disclosure will now be set forth.

Logging Usage Data.

Apparatus 10, in an embodiment, keeps track of the questions that the users are asking. This is for at least two reasons: data mining and training. It may be useful to know what questions are getting asked the most so that that area of inquiry can be a focus for future development efforts. Additionally, it may be useful to know what questions are resulting in relatively low match scores, so that additional training data can be provided in those areas of inquiry. As described above, in an embodiment, apparatus 10 may be configured to log (store) optional user defined or user provided ratings associated with an answer, in addition to our match confidence.

For answers that the local EM 14 knows, apparatus 10 is configured to log the answer to the question being asked. This data provides almost a histogram of question frequency for the known questions and answers. For answers that neither the local EM 14 or the cloud EM 22 know, the cloud EM 22 will log the question that was asked. This means apparatus 10 could not recommend an answer with high enough confidence and apparatus 10 may need additional training questions in order to provide the answer for which the user was looking. Having the logging occur in the cloud, allows monitoring of the results in real time along with the ability to add additional training for existing answers quickly to improve the user experience, all without the user needing to install any new software. In an embodiment, apparatus 10 may be configured to log to upload to EM 22 any logging performed in respect of EM 14, so that such information may be considered in regard to updating questions.

Access Control and Billing.

Apparatus 10 may, as described above, selectively access the cloud EM 22 when certain situations arise. As such, in an embodiment, the cloud EM may be configured to handle aspects of access control and/or billing. If the user does not have access for any reason (e.g., security or contractual), the cloud EM 22 can be updated instantly to allow or disallow continued usage at an individual customer level.

Extensibility.

Apparatus 10 is configured to have new and/or additional content added in a relatively quick and straightforward way via configuration files, without requiring a product update. This allows content to be added not only by the proprietor of the apparatus 10, its business partners, as well as by the users.

Adding Additional Content.

It should be understood that a target system with which the present natural language interface can be used may be updated or enhanced through addition of features. This is true in regard to the workspace analytics embodiment. Without loss of generality, in a constructed embodiment where the workspace analytics system comprises a commercially available SYSTRACK analytics system, additional content may be obtained by way of so-called kits. Kits are bundles of additional content that can be downloaded, for example only, from support portal 12. Kits can include new reports, new SYSTRACK dashboards, and the like. Additionally, new kits can be developed that provide questions and answers for some URL addressable resource where an author feels they can add value. This can be in reference to any URL addressable resource—not just technical or SYSTRACK. For present purposes, it should be appreciated that this new content can be considered new answers.

In an embodiment, a kit can include new question files that can be used to direct a user using the natural language interface to these new answers. The question and answer configuration files will be automatically added to the cloud EM 22 when the kit is added to the support portal 12, so that they may be included in user (customer) queries related to the new content. If the answer is returned from cloud EM 22 and the user does not have the kit associated with the returned answer, a formatted URL will direct the user to, for example, the support portal 12 in order to download the subject kit. When the kit is installed (e.g., on the customer site), the configuration files associated with the downloaded kit will be merged into the local configuration files 16, so that subsequent questions related to the newly-installed kit content can be handled locally.

Upsell/Upgrade Support.

In a SYSTRACK analytics system embodiment, when new kits are made available, for example on the support portal 12, any content will be pushed to the cloud EM 22. In this regard, pushing the content may involve providing configuration files having similar information as described above (e.g., may contain answer definitions, matcher definition, etc.). Under normal operation, the local EM 14 will ask the cloud EM 22 for matches when it does not have a high confidence match. In the case where new content has just been pushed out to the cloud EM 22, the local EM 14 will not yet have question and answer configuration information and thus and no match would be found. However, the cloud EM 22 would have the match, as already described above. Since the rest of the required configuration is not yet on the local EM 14, the natural language interface of apparatus 10 cannot likely finish the process and show the user the answer. In that case, the cloud EM 22 will inform the local EM 14 that the match is new and provide the name of the kit associated with that match. The user can then be prompted to download the subject kit, for example, by going to the support portal 12 to download new kit. The same process can be followed with new versions of existing kits and/or even a new version of the SYSTRACK analytics platform/suite. Accordingly, the cloud EM 22 will be updated frequently and when the local EM 14 asks for resources found only on the cloud EM 22—the cloud EM 22 will inform the user there are updates available.

If certain kits are available only for additional cost, the foregoing process provides a mechanism to offer and allow purchase of this additional functionality to the customer. In other words, through the output of the apparatus 10, the user can see that the system knows the answer, but the user will not be able to gain access to such answer until the associated upgrade and/or additional content and/or software is obtained (e.g., purchase a license).

It should be understood that an apparatus for providing a natural language interface, particularly including an electronic processor, as described herein, may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an apparatus may further be of the type having both ROM, RAM, a combination of non-volatile and volatile memory so that any software may be stored and yet allow storage and processing of dynamically produced data and/or signals.

It should be further understood that an article of manufacture in accordance with this disclosure includes a computer-readable storage medium having a computer program encoded thereon for implementing the natural language interface logic and other functionality described herein. The computer program includes code to perform one or more of the methods disclosed herein. Such embodiments may be configured to execute one or more processors, multiple processors that are integrated into a single system or are distributed over and connected together through a communications network, and where the network may be wired or wireless.

Additionally, the terms "electrically connected" and "in communication" and the like are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A computer-implemented method for providing a natural language interface to process user queries for information managed in a workspace analytics system, comprising:
receiving a user input from a user including capturing input text, wherein the input text defines a natural language user query;
matching the received input text to one of a plurality of predefined pattern-form questions defined in and using a first, local entity matcher executing in a first computer at a first location, wherein the matching is further performed in and using a second, cloud entity matcher executing in a second computer at a second location when the first local entity matcher does not find a match having a confidence level exceeding a predetermined threshold, wherein said matching step is performed by using a third, external entity matcher when neither the first, local entity matcher nor the second, cloud entity matcher finds a match having a confidence level exceeding the predetermined threshold, and wherein before using either the second entity matcher or third entity matcher, detecting an entity contained in the user input text and replacing the text corresponding to the detected entity with a neutralized, generic marker;

selecting a jump target that is associated with the matched pattern-form question;

generating a response to the natural language user query by retrieving information from the workspace analytics system by referencing a link that is based on at least the selected jump target.

2. The method of claim 1 wherein the workspace analytics system has associated therewith a first extent of known entities, said method further comprising identifying, in the captured user input text, at least one entity in the first extent of known entities, using the first, local entity matcher.

3. The method of claim 2 further comprising providing a graphical user interface (GUI) on a first portion of a display visible to the user where the graphical user interface is configured to acquire a speech input from the user which is converted to the user input text;

correcting the converted user input text based on, at least in part, the first extent of known entities associated with the workspace analytics system.

4. The method of claim 1 wherein one or more matches provided by said second, cloud entity matcher pertain to upgrade features available for said workspace analytics system.

5. The method of claim 4 wherein said second, cloud entity matcher is configured with at least one of a matcher definition and an answer definition associated with said upgrade features.

6. The method of claim 4 wherein providing one or more matches by said second, cloud entity matcher further comprises providing a link to information associated with said upgrade feature.

7. The method of claim 6 wherein said information comprises a mechanism for allowing a user to purchase said upgrade feature.

8. The method of claim 1 further comprising associating, for each one of a plurality of answer definitions, at least one or more of the pattern-form questions, wherein each answer definition has an associated jump target that defines a respective entry point into the workspace analytics system to provide information responsive to the associated one or more pattern-form questions.

9. The method of claim 1 wherein said first location and said second location are the same.

10. The method of claim 1 wherein said first location and said second location are different, said second location being remote from said first location.

11. A computer-implemented method for providing a natural language interface to process user queries for information managed in a workspace analytics system, comprising:

receiving a user input from a user including capturing input text, wherein the input text defines a natural language user query;

matching the received input text to one of a plurality of predefined pattern-form questions defined in and using a first, local entity matcher executing in a first computer at a first location, wherein the matching is further performed in and using a second, cloud entity matcher executing in a second computer at a second location when the first local entity matcher does not find a match having a confidence level exceeding a predetermined threshold;

selecting a jump target that is associated with the matched pattern-form question;

generating a response to the natural language user query by retrieving information from the workspace analytics system by referencing a link that is based on at least the selected jump target, wherein the workspace analytics system has associated therewith a first extent of known entities, said method further comprising identifying, in the captured user input text, at least one entity in the first extent of known entities, using the first, local entity matcher, said method further comprising establishing the first extent of known entities in the workspace analytics system includes defining one or more matcher definitions wherein each matcher definition is associated with an entity type, and retrieving from the workspace analytics system, for each matcher definition, a respective set of values for the entity type.

12. The method of claim 11 further comprising providing a configuration file containing the one or more matcher definitions.

13. A computer-implemented method for providing a natural language interface to process user queries for information managed in a workspace analytics system, comprising:

receiving a user input from a user including capturing input text, wherein the input text defines a natural language user query;

matching the received input text to one of a plurality of predefined pattern-form questions defined in and using a first, local entity matcher executing in a first computer at a first location, wherein the matching is further performed in and using a second, cloud entity matcher executing in a second computer at a second location when the first local entity matcher does not find a match having a confidence level exceeding a predetermined threshold;

selecting a jump target that is associated with the matched pattern-form question;

generating a response to the natural language user query by retrieving information from the workspace analytics system by referencing a link that is based on at least the selected jump target said method further comprising detecting an entity contained in the user input text and replacing the text corresponding to the detected entity with a neutralized, generic marker.

\* \* \* \* \*